United States Patent [19]

Hallberg

[11] Patent Number: 5,537,100
[45] Date of Patent: Jul. 16, 1996

[54] SYSTEM AND METHOD FOR ANALYZING CODED TRANSMISSION SENT TO MOBILE MESSAGE RECEIVERS

[75] Inventor: Bryan S. Hallberg, Vancouver, Wash.

[73] Assignees: Sharp Microelectronics Technology, Inc., Camas, Wash.; Sharp Kabushiki Kaisha, Osaka, Japan

[21] Appl. No.: 223,706

[22] Filed: Apr. 6, 1994

[51] Int. Cl.[6] .............................. H04L 7/00; G08B 5/22; H04Q 7/00; H04Q 3/02
[52] U.S. Cl. ........................... 340/825.210; 340/825.440; 455/32.1; 455/38.3
[58] Field of Search ........................ 340/825.44, 825.21; 455/32.1, 343, 38.3, 228

[56] References Cited

U.S. PATENT DOCUMENTS

| | | | |
|---|---|---|---|
| 4,353,065 | 10/1982 | Mori | 455/343 |
| 4,370,753 | 1/1983 | Ehmke | 455/36 |
| 4,652,875 | 3/1987 | Waki | 455/343 |
| 4,663,623 | 5/1987 | Lax et al. | 340/825.44 |
| 4,679,244 | 7/1987 | Kawasaki et al. | 455/343 |
| 4,745,408 | 5/1988 | Nagata et al. | 455/343 |
| 4,839,639 | 6/1989 | Sato et al. | 340/825.44 |
| 4,961,073 | 10/1990 | Drapac et al. | 340/825.44 |
| 4,996,526 | 2/1991 | DeLuca | 340/825.44 |
| 5,010,330 | 4/1991 | Snowden et al. | 340/825.21 |
| 5,136,586 | 8/1992 | Greenblatt | 370/110.4 |
| 5,194,857 | 3/1993 | Gomez | 340/825.44 |
| 5,230,084 | 7/1993 | Nguyen | 455/343 |
| 5,233,344 | 8/1993 | Ohga | 340/825.44 |
| 5,247,519 | 9/1993 | Snowden et al. | 370/94.1 |
| 5,252,963 | 10/1993 | Snowden et al. | 340/825.44 |
| 5,296,849 | 3/1994 | Ide | 340/825.44 |
| 5,309,154 | 5/1994 | Mun et al. | 340/825.44 |
| 5,381,133 | 1/1995 | Erhart et al. | 340/825.44 |

OTHER PUBLICATIONS

U.S. Statutory Invention Registration No. H1173, Published Apr. 6, 1993—Davis et al. "Paging Device With Alternating Alert Outputs".

*Primary Examiner*—Eric Coleman
*Assistant Examiner*—Mark H. Rinehart
*Attorney, Agent, or Firm*—David C. Ripma; Gerald Maliszewski

[57] ABSTRACT

A pager decoding system is provided which is compatible with the POCSAG encoding standard and which improves battery savings. The disclosed pager includes a baud rate detector for evaluating incoming transmissions to determined if the baud rate is compatible with the decoder, and a preamble detector for determining if preamble code is being transmitted. Baud rate information and preamble code information are sampled frequently when the pager's radio receiver is tuned on, to evaluate whether a valid transmission is being received and whether the pager's internal clock is synchronized with the transmission. In the methodology of the invention, when the pager is on standby and waiting to receive a transmission the radio receiver is periodically energized to search for valid data having the correct baud rate, and to search for POCSAG preamble code. Signals with the incorrect baud rate are quickly detected and the radio circuit is shut off to save battery power. Once a valid transmission has been acquired, the pager verifies that it is synchronized with the transmission by confirming the absence of preamble code and the presence of the correct baud rate. The pager's radio circuit does not need to be turned on to receive any of the synchronization signals after the pager's clock is initially synchronized. The invention maximizes battery savings by allowing the radio receiver to be shut off as soon as there is confirmation that the pager's address is not being sent, even before an entire code word has been received. A decoding method is also disclosed.

40 Claims, 6 Drawing Sheets

SYSTEM AND METHOD FOR ANALYZING CODED TRANSMISSION SENT TO MOBILE MESSAGE RECEIVERS

BACKGROUND AND SUMMARY OF THE INVENTION

The present invention relates generally to mobile message receivers, commonly referred to as pagers, of the type which are battery-powered and which monitor pager transmissions encoded with address and message information directed to one or more of the pager units, and more particularly to a system and method for analyzing the coded transmissions sent to pagers to enable the pagers to retrieve any message with a minimum expenditure of battery power.

Mobile message receivers, referred to herein as pagers, are personal message receiving devices which monitor certain broadcast channels used by paging networks to alert or send information to specific pager units. Pagers periodically monitor the channel or channels used by the network to which it is assigned to search for messages. When an incoming message is identified, the pager alerts the user, or displays the message, or otherwise responds in accordance with the message information and the pager's capabilities. Pager units are small, lightweight, battery-operated devices which incorporate power-consuming elements. A major user of battery power is the RF receiving circuit. To reduce the size of the pager batteries, or to extend their useful life, various pager address and message coding techniques have been developed to minimize the time when the power-draining radio receiver is turned on. One widely-used digital broadcast standard, designed to facilitate battery savings and provide for reliable identification of incoming messages, is known by the acronym POCSAG. Developed by British Telecom in the United Kingdom, POCSAG (for "Post Office Code Standardization Advisory Group") is a broadcast standard for signaling pagers and other mobile message receivers. The POCSAG encoding standard uses a transmission format which begins with a preamble code of a predetermined duration (the standard specifies 576-bits) followed by one or more batches of codes, each batch containing a synchronization code followed by 16 code words in 8 predetermined timeslots, or frames. All pagers in a paging network are assigned to one of eight groups corresponding to one of the timeslots in a batch. A pager's address code will only be transmitted in its designated timeslot, which allows the radio circuit in the pager to be turned off most of the time, thus extending the life of the pager's batteries.

Because the POCSAG standard is used in many pager systems, numerous decoding and battery saving protocols have been developed for POCSAG. In general, all prior art battery saving techniques seek to reduce to a minimum the time when the radio receiving circuit is energized, while avoiding inadvertent loss of any messages directed to the pager. It would be advantageous if the POCSAG coded transmissions could be efficiently analyzed in an improved way to further reduce power consumption.

It would also be advantageous to provide a POCSAG decoding system for pagers in which, when the pager is operating in a synchronized mode and its internal clock is synchronized with the pager transmission, the decoder is able to make a bit-by-bit analysis of each code word in the pager's designated timeslot to determine if any of the pager's addresses are being sent. That would allow the pager's radio circuit to be turned off before an entire code word is received.

It would also be advantageous to provide a pager decoding methodology which can determine whether the pager's internal clock remains synchronized with the coded transmission without having to energize the pager's radio receiver to receive the synchronization codes embedded at regular intervals in POCSAG transmissions.

Accordingly, the present invention provides a decoder for use in a mobile message receiver, such as a pager, which receives and processes coded transmissions of a type that selectively include a preamble code and batches of other codes, each such batch including a synchronization code followed by a plurality of code words in predetermined timeslots. One or more of the timeslots are the designated timeslots where one or more of the receiver's addresses is transmitted when information is sent. The receiver also includes an internal clock which is synchronized with a coded transmission when a synchronization code is received. The clock, when synchronized, allows the pager to identify selected bit positions within a transmission. A radio circuit is provided which is selectively enabled to receive a coded transmission and produce a coded signal therefrom. Such coded transmissions are transmitted at various selected baud rates, one or more of the baud rates being the correct baud rate for the pager decoder. The decoder comprises a baud rate detector for monitoring the coded signal from the radio circuit to determine if the baud rate of the coded transmission corresponds to a correct baud rate for the decoder. A preamble detector is provided for monitoring the coded signal to detect preamble code. An address detector is provided for monitoring the coded signal to determine if there is at least a predetermined correlation between the coded signal and the receiver's address. And an enabling controller is provided which is responsive to the receiver's radio circuit, the baud rate detector, the preamble detector, and the address detector for selectively enabling and disabling the radio circuit when the receiver is in a synchronized mode of operation wherein the internal clock of the receiver is synchronized with a coded transmission. The enabling controller enables the radio circuit at the start of each code word in the designated timeslots of the receiver, and disables the radio circuit before an entire code word has been received, if: (a) the baud rate of the batch is determined to be correct; and (b) the coded signal is not a preamble code; and (c) there is less than a predetermined correlation between the coded signal being received and the receiver's address.

It is a feature of the present invention that the receiver frequently samples the transmissions being received for baud rate information and for the presence or absence of preamble code. Whenever the receiver is receiving and the decoder is decoding code words in the receiver's designated timeslots, the present invention uses baud rate and preamble code information to confirm that the receiver's internal clock remains synchronized with the transmission. Continued synchronization can be reliably inferred from a correct baud rate, and the absence of preamble code in the signal being received. The invention allows the pager to reliably receive and analyze only a part of a code word in the pager's designated timeslot before turning off the radio receiving circuit, if the pager and transmission are synchronized. Repeated checks of synchronization are necessary to establish that the pager is reading the start of actual addresses. The invention monitors synchronization without the need to repeatedly enable the radio circuit each time a synchronization code is transmitted. Instead, it derives synchronization information by sampling the baud rate and determining the presence or absence of preamble code, which can be done when the radio circuit is enabled to receive a pager transmission.

In its preferred form, the enabling controller of the pager begins operating in what is called the search mode, or the signal validation mode. In that mode the pager radio circuit is enabled to search for coded transmissions which have the correct baud rate for the decoder. The radio circuit is enabled periodically and responds to the baud rate detector and the preamble detector each time the radio circuit is enabled, to determine if the coded transmission being received is compatible with the decoder. Based on the outputs of the baud rate detector and preamble detector, the controller (1) continues to enable the radio circuit until the receiver's clock becomes synchronized with the coded transmission if either the baud rate of the transmission is correct, or a preamble code is detected; or (2) if the baud rate is incorrect and preamble codes is not detected, it disables the radio circuit. More particularly, the enabling controller responds to the baud rate detector and the preamble detector, as follows: (1) if either the baud rate is correct or preamble code is detected, the enabling controller continues to enable the radio circuit until the receiver's clock becomes synchronized with the coded signal; or (2) if the baud rate is incorrect and preamble code is not detected, the enabling controller disables the radio circuit after an interval sufficient to verify the aforementioned baud rate and preamble code information.

The other preferred mode of operation is called the synchronized mode. When the pager is operating in the synchronized mode the pager's clock is synchronized with the pager transmission and the radio circuit is enabled to receive the start of each code word in the pager's designated timeslot or timeslots and is disabled before an entire code word has been received, if: (a) the baud rate of the batch is determined to be correct; and (b) the coded signal is not a preamble code; and (c) there is less than a predetermined correlation between the coded signal being received and the receiver's address. The controller continues to enable the radio circuit long enough to receive substantially an entire code word if either of the following occurs: (1) if the baud rate is determined to be incorrect; or (2) if preamble code is detected. If either the baud rate is incorrect or preamble code is detected, it is likely that the clock has become unsynchronized with the coded transmission. If the baud rate is incorrect after reading the entire code word, a mathematical analysis of the code word is performed to determine if it is a valid code word. A valid code word will not appear unless the receiver's clock is still synchronized. Consequently, the receipt of a valid code word means the pager's clock is still synchronized. A code word validator is provided to determine if the transmission being received contains a valid code word. Whenever the validator determines that the receiver is receiving valid code words, the enabling controller continues to operate in the synchronized mode and enables the radio circuit at the start of each code word in the pager's designated timeslots. Alternatively, when the code word validator determines that a predetermined number of consecutive code words being received are not valid code words, the enabling controller concludes that synchronization has been lost and discontinues operating in the synchronized mode and returns operation to the signal validation mode.

The invention also includes a method for minimizing the energy consumed by a mobile message receiver, or pager, having a radio circuit and an internal clock and which receives and decodes digitally coded transmissions of the type which selectively include a preamble code followed by batches of other codes. The transmission batches each include a synchronization code followed by a plurality of code words in selected timeslots, at least one of the timeslots being a designated timeslot in which an individual pager's one or more addresses are transmitted when information is sent. Such coded transmissions are sent to such receivers at various selected baud rates, one or more of which is a correct baud rate for the pager decoder. A first embodiment of the method is carried out when the receiver's clock is synchronized with a selected coded transmission, and comprises a first step of enabling the radio circuit at the start of each code word in the designated timeslot or timeslots of the receiver. Another step is to periodically determine if the baud rate of the coded transmission corresponds to a correct baud rate for the receiver. This last-mentioned step is preferably performed once in each batch. Another step is to determine if the coded transmission is preamble code. The two last-named steps, i.e., determining if the baud rate is correct and determining if the transmission is a preamble code, together provide information about whether or not the receiver's internal clock remains synchronized with the coded transmission. Another step is to determine the amount of correlation between the incoming bits of the coded transmission and the receiver's addresses. The three last-named steps are preferably performed substantially simultaneously. The purpose of the step of determining the correlation between incoming bits and the pager's addresses is to determine if the difference between the bits being received and the pager's addresses is sufficiently great to preclude the presence of the pager's address code. The radio circuit can be turned off even before an entire code word has been received if the transmission is not an address code. Consequently another step in the method is to disable, i.e., turn off, the radio circuit before an entire code word has been received if: (a) the baud rate of the batch is determined to be correct; and (b) the coded transmission is not a preamble code; and (c) there is less than a predetermined correlation between the transmission and the pager's address. The information in (a) and (b) determines whether the pager's clock is still synchronized with the transmission. Assuming that the receiver's address is a predetermined bit pattern, the aforementioned step (c) in the step of disabling the radio circuit before an entire code word has been received, preferably further includes the following steps: (1) identifying each bit of the coded transmission as it is received; (2) comparing each bit against the bit patterns of the pager's addresses; and (3) determining if the pattern of the received bits is sufficiently different from the patterns of bits in the pager's addresses to insure that an address is not being received. If the incoming bits do not match a stored pager address, and if the clock remains synchronized, the radio circuit is turned off before the entire code word is received.

The method also provides a signal validation mode in which the pager searches for compatible transmissions. Steps in the method include periodically enabling the radio circuit and: (1) determining if the baud rate of the coded transmission is the correct baud rate for the receiver; and (2) determining if the coded transmission is a preamble code; and (3) using the baud rate and preamble code information to selectively enable the radio circuit to synchronize the receiver's clock with the coded transmission. Once the pager's clock is synchronized with the coded transmission, the pager then continues to operate in accordance with the synchronized mode in which the radio circuit is enabled to receive the code words in the pager's designated timeslots,

DETAILED DESCRIPTION OF THE PREFERRED EMBODIMENT

Figure 1:
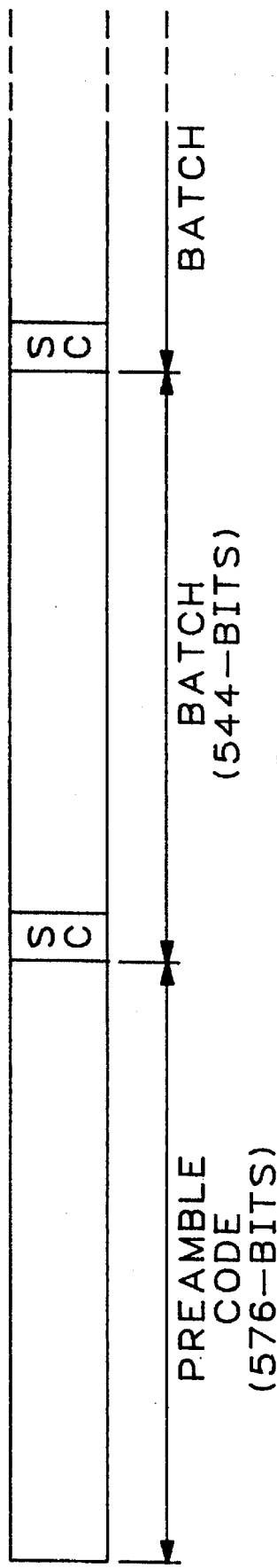
FIG. 1 is a schematic representation of the format of a coded transmission in accordance with the POCSAG standard (prior art)
Figure 2:
FIG. 2 is a schematic representation of a preamble code used in the transmission format of FIG. 1 (prior art)

FIG. 1 schematically illustrates a commonly-used format for encoding transmissions in radio-paging applications. The format was developed in the 1970's by British Telecom and is known by the acronym POCSAG, for "British Post Office Code Standardization Advisory Group." In the POCSAG format, message transmissions sent to individual mobile message receivers, referred to hereinafter as pagers, are grouped and transmitted as a sequence of address codes and message codes. Each time a POCSAG transmission is initiated it begins with a preamble code, illustrated schematically in FIG. 2, having a duration of at least 576-bits alternating between "0s" and "1s" at the baud rate of the transmission. Pager transmissions are broadcast at various selected baud rates depending on the capacity of the network and the pager features and speed offered to customers. Examples of typical baud rates currently used in public paging networks include 2400 bits-per-second, 1200 bits-per-second, and 512 bits-per-second. A paging network may transmit coded signals at different baud rates to different groups of pagers. Most pagers are designed to receive and decode transmissions sent at a single predetermined baud rate, which is referred to herein as the correct baud rate for the pager and decoder. Only transmissions having the correct baud rate are compatible with a particular pager. If a pager is equipped to receive and decode transmissions at more than one baud rate, each baud rate that the pager is capable of decoding is a correct baud rate for the pager.

Figure 3:
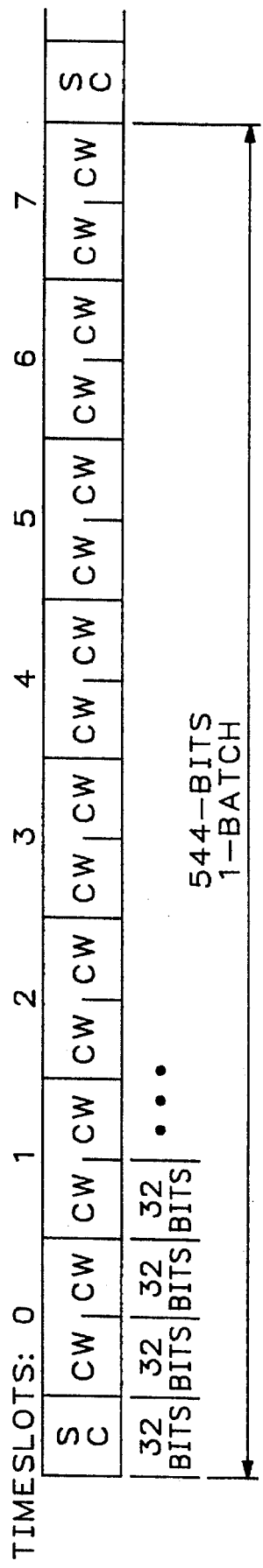
FIG. 3 is a schematic representation of a batch of code words in the POCSAG format containing a synchronization code and sixteen code words in eight timeslots (prior art).

Returning to FIG. 1, the code which follows the preamble code in a POCSAG transmission is a series of code groups called batches. Each batch contains a synchronization code followed by a plurality of code words. FIG. 3 illustrates the format of a single batch. The duration of a batch is 544-bits, including one 32-bit synchronization code word followed by sixteen address code words ("CW" in the Figures) of 32-bits each. The address code words are grouped in eight predetermined timeslots, also referred to as frames or time frames. The timeslots are each 64-bits in duration and contain two 32-bit code words. The purpose of the synchronization code is to allow an internal clock in the pager to become synchronized with the POCSAG transmission. Once synchronized, the pager is able to isolate and decode individual code words in a batch. Each batch starts with a synchronization code and many prior art pagers are designed to receive all or part of each synchronization code to ensure that the pager's internal timing circuits remain synchronized with the transmission being received.

Each pager in a network is assigned to one or more of the eight timeslots in a batch, the assigned timeslots being referred to herein as the designated timeslot or designated timeslots for the pager. The POCSAG protocol provides that, when message information is sent to the pager, one of pager's plurality of address codes is transmitted in one of the pager's designated timeslots. The pager's addresses are never sent in another timeslot. Consequently, when the pager's internal clock is synchronized with the transmission, the radio receiver circuit of the pager can be turned off most of the time and need only be turned on during its designated timeslot or timeslots, thus saving battery power. Most pagers have only a single designated timeslot, to maximize battery savings.

Figure 4:
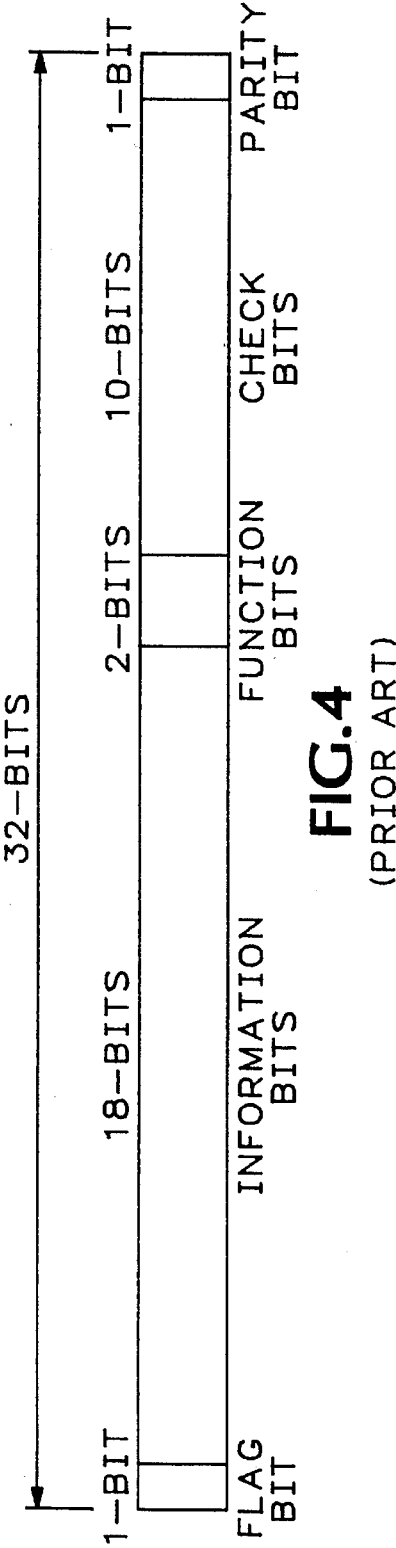
FIG. 4 is a schematic representation of a single-32-bit code word used in the transmission format of FIG. 1 (prior art).

The format of individual code words in a batch is illustrated schematically in FIG. 4. Each 32-bit code word comprises one flag bit (used to distinguish between address and message code words), followed by eighteen informational or address bits (where a pager's address is encoded when a message is sent to the pager), followed by two function bits (generally used to specify the type of signaling device employed to alert the user), ten check sum bits (used in mathematical analysis and error correction of the address bits), and one parity bit (also used in the mathematical analysis of code words). The foregoing detailed description is prior art, well known to those familiar with the POCSAG paging standard.

Figure 5:
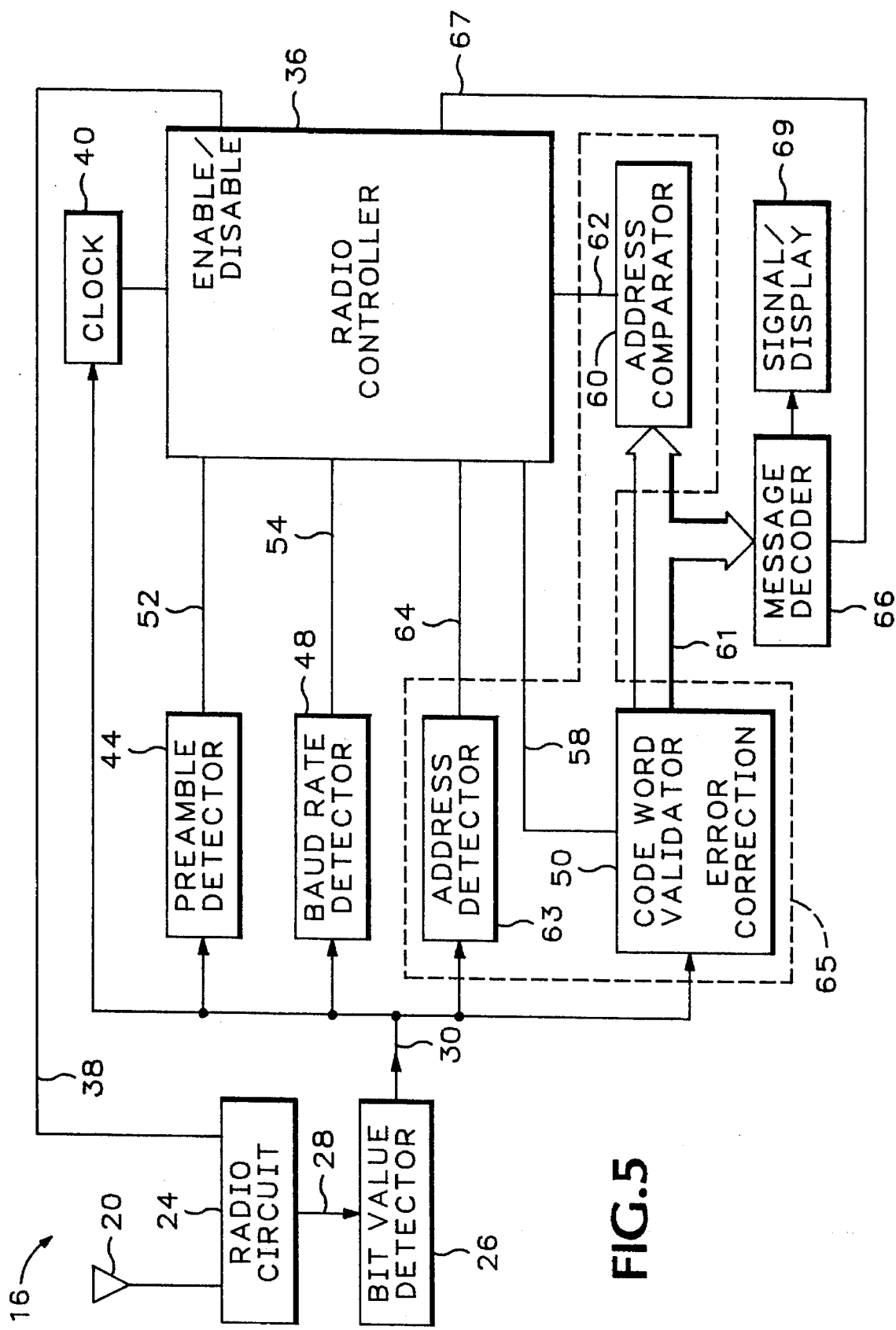
FIG. 5 is a block diagram of a mobile message receiving pager and signal decoder in accordance with the present invention.

FIG. 5 is a block diagram of a pager 16 designed to receive and decode POCSAG transmissions in accordance with the system and method of the present invention. A receiving antenna 20 built into pager 16 is operatively connected to a radio circuit 24 designed to receive coded pager transmissions from a regional, national, or international paging network. When radio circuit 24 is energized, it receives pager transmissions from the network on one of a plurality of suitable frequencies assigned to carry paging signals. The radio circuit 24 is energized from a battery power supply (not shown). Since radio circuit 24 is frequently energized and de-energized, it is preferably of a type designed for repeated cycling on and off.

The output of radio circuit 24 is supplied to a bit value detector circuit 26 via a line schematically illustrated at 28. Bit value detector 26 is a phase-locked-loop or similar device for identifying the values of received bits (0 or 1) and the edges between transitioning bits (0 to 1 or 1 to 0). Detector 26 outputs a coded signal which ideally, i.e., absent signal interference, corresponds to the paging signal encoded for broadcast by the paging network prior to transmission. The coded signal on line 30 is supplied to several devices used in the system and method of the present invention to identify and decode information sent to pager 16.

At the heart of the decoding and battery saving circuitry is radio controller 36, which selectively enables and disables radio circuit 24 via connection 38. Radio controller 36 is a device sequencing controller or state machine which turns on and off radio circuit 24 and performs other functions in accordance with the method of the present invention, described in detail below. Controller 36 includes a clock 40 to time its operations and the operation of the entire pager decoder. Clock 40 is referred to as the pager's clock or the receiver's clock, or the controller's clock and, as used herein, is preferably a suitable timer or counter which is reset or zeroed whenever the pager receives a synchronization code via line 30. Clock 40, once it has been synchronized with a coded transmission, allows controller 36 to identify where each batch, each designated timeslot, and each code word begins. Clock 40 may alternatively be referred to as a bit position counter, a code word position counter, a bit position identifier or by similar designations. One function of clock 40 is to determine the bits which start the code words in a batch. Clock 40 is typically fed timing pulses from a crystal oscillator (not shown), and timing pulses are similarly supplied to other operational elements of the pager such as bit value detector 26 and controller 36. The timing pulses from the oscillator are fractions of the duration of a single bit and are converted into suitable clock pulses by counters or the like, as is well known to those skilled in the art. As used herein the term "clock" and the element represented by box 40 in FIG. 5 serves to time the duration of each bit received by the pager and each 544-bit batch, allowing the radio controller 36 to identify the start of the batches and the timeslots. When clock 40 is synchronized with a transmission, after a synchronization code is received, the radio circuit does not need to be energized to receive subsequent synchronization codes unless the clock becomes unsynchronized.

Radio controller circuit 36 enables and disables, or turns on and off, radio circuit 24 in accordance with the system and method of the present invention. Because it is necessary to power up and stabilize the radio circuit 24 before it can begin to receive a transmission, controller 36 actually turns on all or part of the radio circuit in advance of the actual time it is "enabled." Conventional radio circuits suitable for use in pagers require approximately 20 milliseconds to fully stabilize all internal elements before starting to receive signals. An improved type of radio circuit and controller, designed to energize a radio circuit in stages to maximize efficiency, is preferred for use with pager 16. The choice of radio receiver for use in pager 16 is, however, a matter of design choice and prior art radio receiver circuits which are enabled and disabled conventionally will function adequately for the purposes of the present invention. It is only necessary to turn on the power supply to the radio circuit approximately 20 milliseconds in advance of the time when the radio circuit is actually enabled, thereby allowing the radio circuit time to stabilize and become "enabled."

The coded signal on line 30, derived from radio circuit 24 and bit value detector 26, is supplied simultaneously to several other devices in pager 16. One such device is preamble detector circuit 44, which is operatively connected to bit value detector 26 and receives and monitors the coded signal on line 30 to detect the presence or absence of preamble code in the signal. Preamble detector 44 samples incoming bits of the coded signal and looks for sequences of alternating 1s and 0s which indicate the presence of a preamble code. Preamble detector circuits are well-known prior art devices. In detector 44, incoming bits on line 30 are read, and if the sequence is not 01010101 . . . or 101010101 . . . , the absence of preamble code is confirmed by changing the state of the signal on line 52. The preferred preamble detector used with the present invention analyzes the bits on line 30 each time the radio circuit 24 is enabled. The initial output on line 52 will indicate "preamble code present." Only when a bit pattern is received which differs from preamble code does the output of detector 44 change to indicate "not preamble code."

The preamble detection routine used in detector 44 looks for two different patterns. One pattern: 010101010 . . . will be referred to as Pattern X and the other pattern: 1010101010 . . . will be Pattern Y. When bits are received at detector 44 they are compared against pattens X and Y. Assuming incoming bits arrive with the following pattern: 1000000000 . . . the detector analyzes the bits by simultaneously comparing the bits against Patterns X and Y. The first bit is a 1. Therefore it is an "error" bit (i.e., it does not correlate with the bit in that bit position) with respect to Pattern X. The routine followed in detector 44 is to skip the next four bits and look at the subsequent bits to see if there are any others are "errors" within the duration of a 32-bit code word. The sixth incoming bit is a 0, and the sixth bit in Pattern X is a 1. Consequently, the sixth bit is also an error as compared with Pattern X. In accordance with the analytical routine in detector 44, two errors more that 5-bits apart means the incoming bit pattern is not Pattern X. Detector 44 thus concludes that the incoming bits are not Pattern X. Analysis is also performed on Pattern Y. The first bit is a 1. The first bit in Pattern Y is a 1, therefore the bit correlates with Pattern Y. The second bit in the incoming bits is a 0. The second bit in Pattern Y is a 0. That bit also correlates. The next incoming bit is a 0. The third bit in Pattern Y is a 1. Therefore the third incoming bit is an "error." The routine skips the next four incoming bits, bits 4–7, and compares the eighth incoming bit 0 against the eighth bit in Pattern Y, which is a 0. That bit also correlates. The ninth incoming bit is a 0. The ninth bit in Pattern Y is a 1, which is the second "error," and the first and second "errors" are more than 5-bits apart. Therefore, detector 44 will conclude that the incoming bits are not Pattern Y. Since the incoming bits are not either of the possible preamble patterns, detector 44 will change the state of the output on line 52 to indicate "not preamble" when nine bits have been received.

The exact number of incoming bits required for preamble detector 44 to preclude the presence of preamble code depends on the bit pattern. Usually a pattern which is not preamble code will be detected within 7–10 bits. If the incoming bits are, in fact, preamble code, the output of detector 44 will remain in a state indicating "preamble code" and controller 36 will continue to enable radio circuit 24 for an entire code word, 32-bits, in order to confirm the presence of the preamble code.

A baud rate detector 48 is also connected to bit value detector 26 and receives and monitors the coded signal on line 30 to determine if the baud rate of the coded signal corresponds to a correct baud rate for pager 16. Baud rate detectors are well known in the prior art and can employ various methodologies to determine the baud rate of a transmission. Generally, baud rate detectors sample the bits being received and respond when a predetermined number of digital transitions (0 to 1 or 1 to 0) occur within a predetermined interval. Alternatively, conventional baud rate detectors look for the occurrence of a sufficient number of adjacent-bit transitions at a frequency which will preclude the presence of lower baud rate data. The minimum information required from baud rate detector 48, in order to carry out the present invention, is an indication whether the baud rate is "correct," i.e., it corresponds to the one or more baud rates which the pager is capable of decoding; or is "incorrect," i.e., it is a baud rate not compatible with the operation of the pager decoder. The baud rate information from detector 48 is supplied as a change of state on schematic line 54 to controller 36.

An error correction/code word validator circuit 50 (referred to as code word validator 50) is also connected to bit value detector 26 and receives and monitors the coded signal on line 30 to perform error correction on the coded signal whenever the pager is synchronized with the pager transmission. Pager decoders incorporate some form of error correction in order to overcome the inherent reception problems and noise which result from poor reception environments, weak signals, and other causes common to pagers. The original POCSAG standards contemplated the use of code words configured to allow for a limited number of error bits to be identified and corrected. Error correction methodologies used in prior art pagers include the BCH ("Bose-Chaudhuir-Hocquenghen") correcting code. The BCH code allows a predetermined limited number or pattern of bit errors in a code word to be corrected based on an analysis of a pattern of calculated check bits (see FIG. 4). The details of BCH error correction are well known to those skilled in the art. See, for example, Rhee, Error Correcting Coding Theory, McGraw-Hill, Chapter 7, Pub. 1989. Regardless of the exact error correction method used in pager 16, code word validator 50 receives bits on line 30 and initially determines if the errors (if any) detected in a code word are "correctable." Errors mean bits which are incompatible with mathematically correct code words. The pager's error correction methodology is applied to received code words in order to identify and correct a limited number of bits that, if not corrected, would render the code word mathematically invalid. Typical prior art error correction methodologies employing the BCH code are able to correct up to two random bit errors or a five-bit burst error. The error correction methodology described in the co-pending patent application referred to in this paragraph uses the latter technique, but improves upon it in important respects including also analyzing incoming code words using a compatible methodology to improve battery savings over prior art systems. Using either methodology, error correction allows only a limited number of bits to be identified and corrected. If the error bits in a received code word are correctable, validator 50 outputs a signal on line 58 indicating a valid code word and outputs the code word on line 61. The resultant corrected code word is checked against the pager's addresses by address comparator 60, which is connected to validator 50 by line 61. Comparator 60 includes or has access to a storage register where the predetermined addresses of the pager are stored for a bit-by-bit comparison with the corrected code word in validator 50. If a code word which has been received is confirmed to be the pager's address, a signal is sent to controller 36 via line 62 to initiate decoding of an incoming message, as will be described more fully below.

An address detector circuit 63 is also connected to bit value detector 26 and receives and monitors the coded signal on line 30 to make a quick determination if there is less than at least a predetermined correlation between the incoming bits and the pager's address. Its operation will be described in detail below. The function of address detector 63 is to provide a signal to controller 36, via line 64, if the differences between the incoming bits and the pager's address are so great that, even after performing error correction, the incoming code word could not be the pager's address. Together with the code word validator 50, and address comparator 60, address detector 63 functions as a code word reader 65 that is capable of performing all the analyses required to read, error correct, and compare received code words against the pager's internally-stored addresses. The code word reader circuitry 65 monitors the coded signal on line 30 to determine if it contains valid code words (that function being provided by validator 50) and also to determine if the initially-received bits of incoming code words have, or do not have, a predetermined correlation with the pager's addresses (that function being provided by address detector 63). Code word reader 65 supplies information about the code words received by the pager to radio controller 36, allowing the controller to determine if a code word should be received in its entirety, or if the radio circuit should be turned off. It also determines if message information is to follow, based on information contained in the code words. Finally, code word reader 65 helps determine if the pager's clock 40 remains synchronized with the coded transmission by selectively determining if received code words are mathematically valid.

In operation, address detector 63 receives the incoming bits of the coded signal on line 30 and makes a bit-by-bit comparison between the arriving bits and the one or more predetermined address sequences stored in suitable storage registers within pager 16. Most pagers are addressable by a plurality of different address code words. One address is usually reserved for transmissions to that individual pager, and other addresses are assigned to specified groups of pagers to allow the paging network to access multiple pagers without transmitting a long series of identical messages. The number of stored pager addresses in a pager 16 is a matter of design choice, with a typical number being 3–4 such addresses. Whenever a transmitted code word is received, and clock 40 is synchronized, address detector 63 compares arriving bits with the bits in corresponding bit positions in each of the pager's stored addresses. Uncorrelated bits, i.e., bits which are different from the corresponding bits in an address, are identified. The function of address detector 63 is to make a comparison between the incoming bits and all the pager addresses and to output a signal if the incoming bits will not correspond to a pager address even after error correction is performed on the incoming code word. Put another way, address detector 63 identifies incoming code words which are sufficiently different from any of the stored pager addresses that the transmitted code word could not be one of the pager's addresses.

The methodology used in address detector 63 is to look for a pattern of uncorrelated bits which render the received code word uncorrelatable with any of the pager's addresses using the error correction routine of the pager. For example, if BCH error correction is used in validator 50, and it has the capability of correcting up to two random bit errors in a code word, the address detector 63 will look for bit errors in excess of 2 before deciding that an incoming code word is uncorrelatable with one or more of the pager's addresses. The preferred embodiment of the present invention employs burst error correction in validator 50. That system is able to correct up to 5 consecutive bit errors in a single "burst." Consistent with that error correction routine, the preferred embodiment of address detector 63 seeks to identify a pattern of uncorrelated bits that includes at least one uncorrelated bit outside the first group of 5 consecutive bits that begins with an error bit. The following examples will explain the methodology:

TABLE 1

Sample Pager Addresses

| Address A: | 0 1001 0110 1011 0100 00 |
|---|---|
| Address B: | 0 0000 0010 1110 0001 00 |
| Address C: | 0 0111 1000 1001 0000 00 |

Table 1 shows three representative pager addresses stored in pager 16. When the pager is operating in sync with a coded transmission, i.e., clock 40 is synchronized, controller 36 enables the radio circuit in the pager's designated timeslots and begins to receive the bits of code words. Table 2 shows the first 10 bits of a code word received by pager 16.

TABLE 2

| | F | Address Bits |
|---|---|---|
| Bit Position No.:<br>Incoming Bits: | 0 | 1 2 3 4 5 6 7 8 9 10... |
| Example #1 | 1 | 0 1 1 0 0 1 0 0 1 |
| Address A errors | * | * *   * |
| Address B errors | * |   * *   * |
| Address C errors | * | *     *   * |

The bits shown in the box under "Incoming Bits:," marked "Example #1," are as follows: 1 0110 0100 1 . . . Address detector 63 makes a comparison between each of the addresses shown in Table 1 and the incoming bits in Table 2, Example #1. The lines "Address_errors" in Table 2 shows the positions of the uncorrelated bits as compared with address A, B, and C. In this example, errors occur at bit numbers 0, 1, 2, and 5. In accordance with the preferred burst error correction methodology, up to five consecutive bits can be corrected by code word validator 50. Address detector 63 is able to reject Example #1 as "Not Correctable With Address A" when the error in bit position number 5 is detected. The analysis is as follows: The first uncorrelated bit in the code word is the flag bit, in position number 0. Address detector 63 then ignores a predetermined number of subsequent consecutive bits corresponding to the number of consecutive bits subject to burst error correction. In the preferred error correction methodology of validator 50, burst errors (i.e. group of consecutive bits) of up to five consecutive bits are subject to correction. That means uncorrelated bits more than five bits apart cannot be corrected. Therefore, consistent with the methodology, address detector 63 identifies the first uncorrelated bit in an incoming code word, counts four more bits, and begins looking for additional error bits. As soon as an error bit is encountered more than four bits after the first uncorrelated bit, address detector 63 concludes that it is "Not Addresses A." In Example 1, Table 2, the first uncorrelated bit is at position 0, identified in the "Address A errors" line with an asterisk. The address detector then ignores the next four bits, i.e., bit positions 1–4, and begins looking for the next uncorrelated bit. The bit in position number 5 is an error bit. Consequently, address detector 63 will determine that the bits in Example #1 are "Not Address A" after six bits have been received.

Address detector 63 simultaneously compares the bits in Example #1 with addresses B and C, and with any other addresses stored in the pager. In the example of Table 2, the first bit which does not correlate with address B is in bit position 0. The address detector again ignores the bits in positions 1–4. The first uncorrelated bits after bit number 4 is bit number 6. Consequently, address detector 63 is able to eliminate Address B after seven bits have been received.

When Address C is compared against the bits in Example #1, Table 2, the first uncorrelated bit is again in bit position 0. Address detector 63 ignores any uncorrelated bits in positions 1–4 and, beginning with bit #5, responds to any additional uncorrelated bits. The next uncorrelated bit is in position number 6. Consequently, address detector 63 is able to eliminate Address C after seven bits. The process is repeated for any additional pager addresses stored in the pager.

In the example of Table 2, address detector 63 will output a signal on line 64 indicating that the incoming bits are uncorrelatable with any of the pager's addresses after seven bits have been received. That is the largest number of bits required to eliminate all the addresses. The exact number of bits required for address detector 63 to conclude that none of the pager's address are being received depends on how closely the incoming bits correlated with the pager's stored addresses.

Another example of the operation of address detection 63, Example #2, is provided in Table 3, where the start of a code word received is as follows: 0 0010 1111 11 . . .

TABLE 3

| | F | Address Bits |
|---|---|---|
| Bit Position No.:<br>Incoming Bit: | 0 | 1 2 3 4 5 6 7 8 9 10... |
| Example #2 | 0 | 0 0 1 0 1 1 1 1 1 1 |
| Address A errors |   | * * * * |
| Address B errors |   |   * *   *   * |
| Address C errors |   | *   *   * * |

Like the previous example, address detector 63 compares the incoming bits of Example #2, Table 3, against addresses A, B, and C. Beginning with Address A, the first bit which does not correlate is in bit position number 1. The address detector ignores the bits in positions 2–5, and beginning with bit number 6, begins to look for additional uncorrelated bits. Bit number 6 is the first uncorrelated bit encountered. Consequently, address detector 63 determines that the bits in Example #2 are not address A after seven bits have been received. For address B, the first uncorrelated bit is in position number 3. Address detector 63 ignores the bits in positions 4–7 and, starting with bit number 8, begins to look for additional uncorrelated bits. Bit number 8 is the first uncorrelated bit encountered. Consequently, address detector 63 determines that the bits in Example #2 are not address B after receiving 9-bits. Similarly, the address detector compares the incoming bits in Example #2 against address C. The first uncorrelated bit is in position number 2. The address detector ignores the bits in positions 3–6 and, starting with bit number 7, begins to look for additional uncorrelated bits. Bit number 7 is the first uncorrelated bit encountered. Consequently, address detector 63 concludes that the bits in Example #2 are not address C after receiving 8-bits. Altogether, address detector 63 is able to conclude that the incoming bits in Example #2, Table 3, are not any of the pager's addresses within the first nine bits received.

Still another example is provided with reference to Table 4. The incoming bits are referred to as Example #3. Address detector 63 compares the bits in Example #3 against addresses A, B, and C.

TABLE 4

| | F | Address Bits | | | | | | | | | | | | |
|---|---|---|---|---|---|---|---|---|---|---|---|---|---|---|
| Bit Position No.: | 0 | 1 | 2 | 3 | 4 | 5 | 6 | 7 | 8 | 9 | 10 | 11 | 12 | ... |
| Incoming Bits: | | | | | | | | | | | | | | |
| Example #3 | 0 | 0 | 1 | 0 | 1 | 1 | 1 | 1 | 0 | 1 | 0 | 0 | 0 | |
| Address A errors | * | * | | * | | | | | | * | | | | |
| Address B errors | | * | | *. | * | * | | | | | * | | | |
| Address C errors | | | * | | | * | * | | | | | | * | |

In Example #3, the first bit which does not correlate with address A is in position number 1. The address detector ignores the bits in positions 2–5 and begins to look for additional uncorrelated bits starting with bit number 6. The first uncorrelated bit encountered after position number 5 is in position number 11. Consequently address detector 63 concludes that the bits in Example #3 are not address A after receiving 12 bits. Comparing the bits in Example #3 against address B, the first uncorrelated bit is in position number 2. The address detector ignores the bits in positions 3–6 and, starting with bit number 7, begins to look for additional uncorrelated bits. The bit in position number 10 is the first uncorrelated bit encountered. Consequently address detector 63 concludes that the bits in Example #3 are not address B after 11-bits have been received. Finally, the bits in Example #3 are compared against address C. The first uncorrelated bit encountered is in position number 3. Address detector 63 ignores the bits in positions 4–7 and begins to look for additional uncorrelated bits, starting with the bit in position number 8. Bit number 12 is the first uncorrelated bit encountered. Consequently, address detector 63 concludes that the bits in Example #3 are not any of the pager's addresses after 13-bits have been received.

The exact number of bits received before address detector 63 is able to output a signal on line 64 indicating that the incoming bits are "not the pager's addresses" varies with the number and pattern of uncorrelated bits transmitted. Address detector 63 will process the incoming bits in the foregoing manner until all stored addresses in the pager have been precluded. It sometimes happens that the elimination of one of more addresses requires all or virtually all of the first nineteen bits in a code word to be received before one or more of the pager's addresses is precluded. If address detector 63 receives the first nineteen bits in a code word, controller 36 automatically causes radio circuit 24 to remain on through the entire code word to allow validator 50 to error correct the code word, after which the code word is compared directly against the stored pager addresses in address comparator 60. In most cases where a pager is not being addressed, address detector 63 is able to eliminate all pager addresses before nineteen bits have been received. If there is also a simultaneous confirmation that the pager's clock 40 remains synchronized with the pager transmission, pager 16 is able turn off radio circuit 24 before receiving an entire code word, thereby saving battery power. Address detector 63 provides a means for making a quick determination that there is less than a predetermined level of correlation between the incoming bits and the pager's addresses, thus allowing the radio controller 36 to turn off radio circuit 24. Other error correction methodologies are possible for pager 16, for example random bit error correction wherein up to a limited predetermined number of uncorrelated bits are correctable. If such a methodology is used in the pager, the address detector performs its function by counting the number of uncorrelated bits and, when that number exceeds a predetermined level, it concludes that the bits will not correlate the address being tested. Overall, address detector 63 looks for patterns of uncorrelated bits which preclude the presence of the pager addresses to which the incoming bits are being compared. When the number or pattern of uncorrelated bits exceeds a predetermined level, the address detector concludes that the incoming bits are not the pager's address.

When pager 16 receives a code word corresponding to one of the pager's addresses, it means that message information is likely to follow. That message information is decoded by message decoder circuit 66. Message decoder 66 is operatively connected to controller 36 via line 67. After the pager's address has been received, error corrected by code word validator 50, and verified as a correct address by address comparator 60, controller 36 initiates message reception. Message code words are error corrected by code word validator 50 and transferred, via line 61, to message decoder 66 for display, or for initiation of an audible signal, or the like, as depicted schematically at 69. The message decoding routine in decoder 66 is conventional and a matter of design choice familiar to those skilled in the art.

The principle function of controller 36 is to selectively enable or disable power consuming operating elements of the pager, most particularly radio circuit 24, in response to the outputs of preamble detector 44, baud rate detector 48, code word validator 50, and address detector 63. Controller 36 operates in one of two principal modes, depending on whether the pager is on "standby" awaiting the reception of a coded pager transmission, or has begun receiving a valid pager transmission and clock 40 is synchronized with the transmission. In the description below, the mode of operation when the pager is on standby, and has not yet become synchronized with a valid pager transmission, is referred to as the signal validation mode 90, or, alternatively, the search mode. The mode of operation when the pager is receiving a valid pager transmission, and clock 40 is synchronized with the transmission, is referred to as the synchronized mode 92.

Address detector 63 functions together with preamble detector 44 and baud rate detector 48 to provide information to controller 36 which allows the controller to turn off radio circuit 24 if: (1) clock 40 remains synchronized with the coded transmission, and (2) there is less than a predetermined correlation between the coded transmission and the pager's addresses. Synchronization is confirmed when the preamble detector 44 outputs a signal on line 52 indicating the absence of preamble code in the received signal and when baud rate detector 48 outputs a signal on line 54 indicating that the received signal has the correct baud rate. Address detector 63 determines whether there is less than a predetermined correlation between the transmission and the pager's address.

Figure 6:
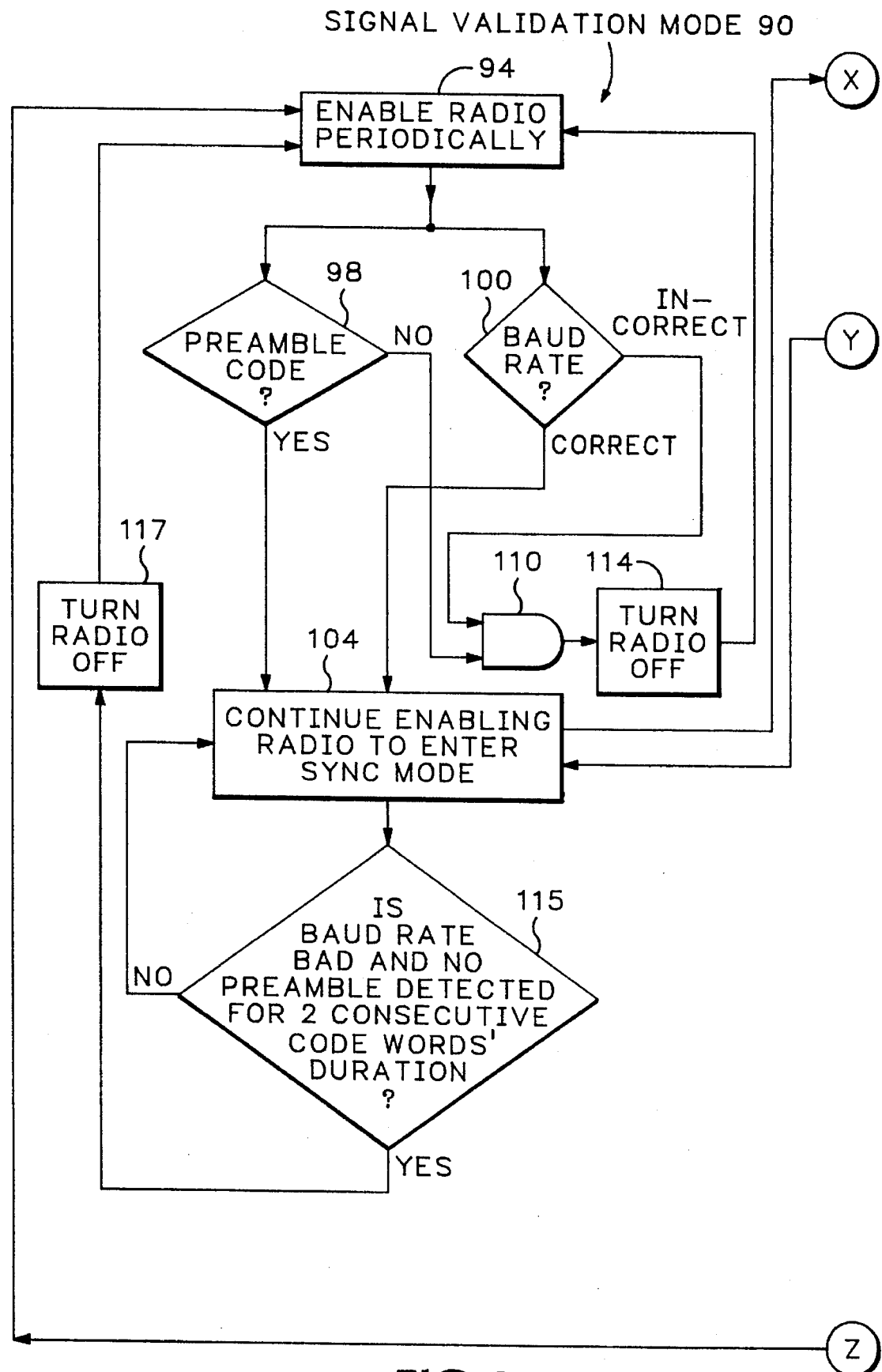
FIG. 6 is part of a flow diagram illustrating the operation of the pager and decoder of FIG. 5 when the pager is operating in the signal validation mode.
Figure 7:
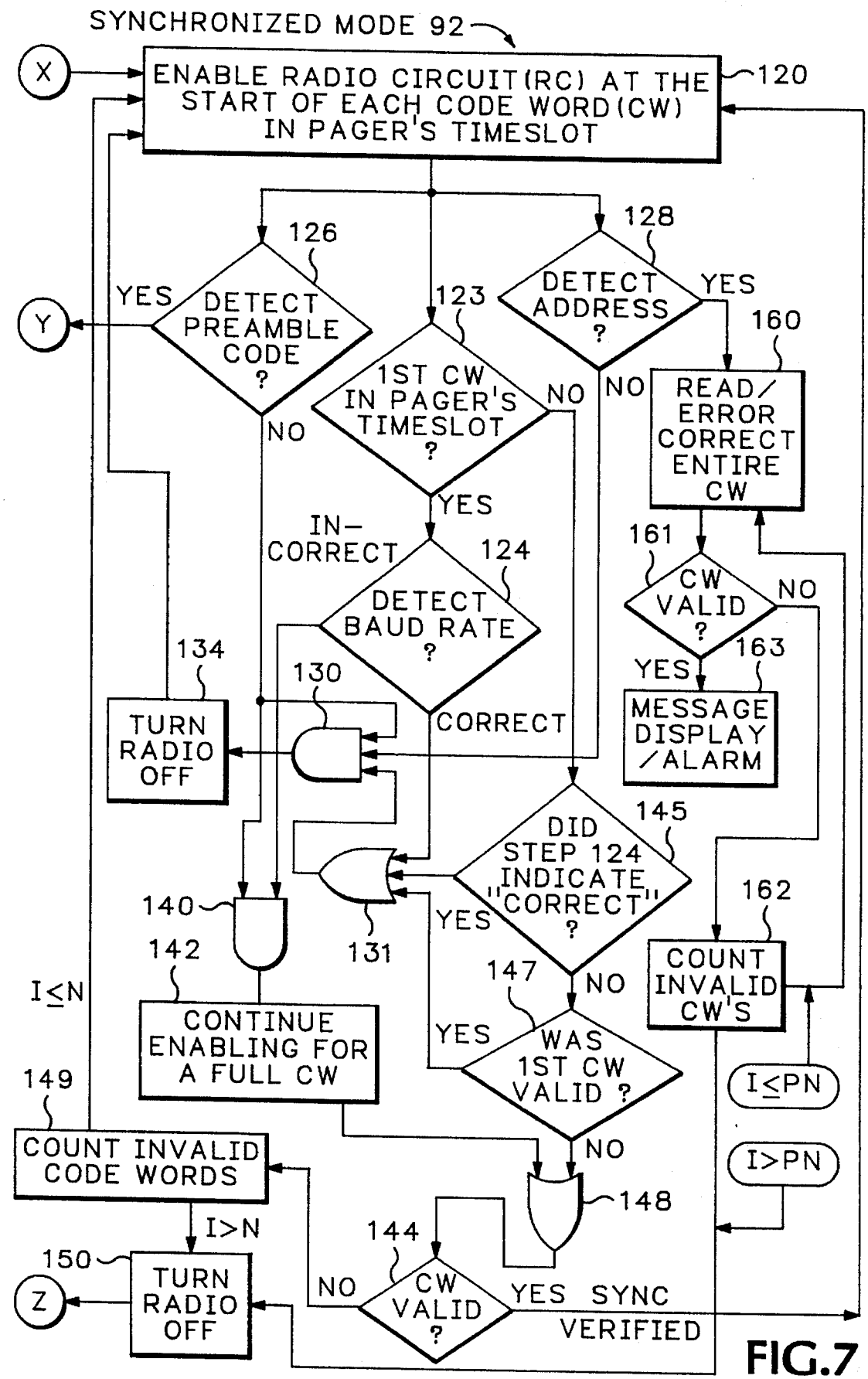
FIG. 7 is part of a flow diagram, and a continuation of the flow diagram of FIG. 6, illustrating the operation of the pager and decoder of FIG. 5 when the pager is operating in the synchronized mode.

FIGS. 6 and 7 together form a flow chart illustrating operation of pager 16 in accordance with the method of the invention. FIG. 6 illustrates operation in the signal validation mode 90. FIG. 7 illustrates operation in the synchronized mode 92. Lines X, Y, and Z in FIGS. 6 and 7 extend between the figures. Turning first to FIG. 6, when the pager 16 is switched on it begins operating in signal validation mode 90. It will operate in signal validation mode 90 until clock 40 becomes synchronized with a valid pager transmission. The first step in the method of operation is step 94, wherein controller 36 enables radio circuit 24 periodically to search for valid transmissions. Valid transmission are pager transmission which have a baud rate corresponding to the correct baud rate for the decoder, and are thus compatible with its operation. The periodic interval in step 94 is preferably slightly shorter than the 576-bit duration of a preamble signal transmitted at the start of each POCSAG transmission, to insure that the pager will not "miss" the preamble. A typical interval in step 94 is to enable the radio circuit once every 544-bits, which is the duration of a batch. The next steps are steps 98 and 100, which are performed substantially simultaneously by preamble detector 44 and baud rate detector 48, respectively. In step 98, preamble detector 44 determines if the coded signal on line 30 is preamble code. As discussed above with reference to FIG. 5, preamble detector 44 initially outputs a signal indicating "yes, preamble" and switches to "no, not preamble" only after confirming the absence of preamble code in the received signal. When operating in the signal validation mode 90, baud rate detector 48 preferable initially assumes a "correct" baud rate and looks for a bit pattern consistent with an "incorrect" baud rate. When steps 98 and 100 are performed, controller 36 enables radio circuit 24 as part of carrying out step 94. Controller 36 continues to enable the radio circuit for a predetermined interval if the output of detector 44 does not change and the "yes, preamble code" result of step 98 is maintained, or if the output of detector 48 does not change and "correct baud rate" result of step 100 is maintained. That predetermined interval is preferably one code word, 32-bits, and the radio circuit remains enabled for that interval to confirm the validity of the results of step 98 or step 100. The method then proceeds to step 104, in which the controller continues to enable the radio circuit until a synchronization code is encountered. If, while step 104 is being carried out, the output of at least one of detectors 44 and 48 changes such that the output of detector 44 is "no" and the output of detector 48 is "incorrect," then, in accordance with step 115, controller 36 will monitor the outputs of the detectors 44 and 48 for at least a predetermined duration to confirm the loss of valid signal and, if the loss is confirmed, the method proceeds to step 117 and returns step 94. If loss of signal is not confirmed, the method returns to step 104. The predetermined duration used in step 115 is preferably the duration of two code words, i.e., 64-bits. Loss of signal is confirmed when detectors 44 and 48 output "not preamble" and "incorrect baud rate," respectively, for the duration of two consecutive code words. Assuming the coded signal on line 30 remains preamble code or the baud rate remains correct, step 104 will continue as long as necessary until the pager receives a transmitted synchronization code.

If the result of steps 98 and 100 are "not preamble code" and "incorrect baud rate," respectively, as indicated by AND gate 110, the method proceeds to step 114. In step 114 the controller turns off radio circuit 24 and returns the method to step 94. Step 114 is reached only if preamble detector 44 and baud rate detector 48 switch from their respective initial states to "not preamble code" and "incorrect baud rate" and holds those outputs coincidentally to trigger AND gate 110. Step 114 can be reached in less than a code word if detectors 44 and 48 are able to signal "not preamble code" and "incorrect baud rate," respectively, in less than the duration of a code word.

Normally, when the pager is operating in the signal validation mode, preamble code will be encountered first (step 98) unless the pager happens to be switched on or brought within range of a transmitter in the middle of a pager transmission, in which case the preamble code will not be encountered, although the correct baud rate might be encountered (step 100). In either case, once it is turned on in step 104 the radio circuit 24 will remain on until a synchronization code is encountered, at which time clock 40 automatically becomes synchronized with the transmission, i.e., its bit counter is zeroed.

Once clock 40 is synchronized, pager 16 and controller 36 begin operating in synchronized mode 92, shown in FIG. 7. The following is a description of the operating method of the present invention when the clock is synchronized with the pager transmission. The method minimizes energy consumption while a coded transmission is being received and decoded. The first step 120 is to enable radio circuit 24 at the start of each code word in the one or more designated timeslots assigned to the pager. Each timeslot contains two code words and step 120 enables the radio circuit at the start of each of the two code words. In some situations, described below, the radio circuit will turn on to receive the first code word in a timeslot and simply remains on through the start of the second code word. Following step 120, the next steps, carried out substantially simultaneously, are the detection of the baud rate, detection of preamble code, and detection of the pager's addresses in the coded signal on line 30 of FIG. 5. To check the baud rate the method first asks if the code word being received is the first code word in the timeslot, in step 123. In the preferred embodiment, the baud rate is checked only on the first code word in a timeslot. If it is the first code word, the method proceeds to detect whether the baud rate is correct or incorrect, in step 124. Step 124 is carried out by baud rate detector 48. If the baud rate is correct for the decoder, the result is supplied to AND gate 130 via OR gate 131. The other inputs to OR gate 131 are used when the radio circuit is receiving code words other than the first code word in a timeslot, as will be described below. The other inputs to AND gate 130 are from steps 126 and 128.

In step 126, performed each time the radio circuit 24 is enabled, detector 44 determines if the coded transmission is preamble code. In step 128 address detector 63 determines if there is less than a predetermined correlation between the incoming bits of the coded transmission and the pager's address. If in step 124 the baud rate is found to be correct, and in step 126 the signal is not preamble code, and in step 128 the address detector determines that the signal received is not one of the pager's addresses, the method proceeds to step 134, via AND gate 130. The method calls for turning off the radio circuit (step 134) whenever the preamble code information and baud rate information indicate that the pager's clock is still synchronized with the transmission, and the incoming bits are not the pager's address. Synchronization is confirmed when preamble code is not detected (step 126) and the baud rate is correct (step 124).

If in step 124 baud rate detector 48 determines that the baud rate of the first code word in the timeslot is incorrect, and if no preamble code is detected in step 126, as indicated by AND gate 140, the next step 142 is to continue enabling radio circuit 24 for at least the entire code word. The combination of an incorrect baud rate (step 124) and no preamble code (step 126) sometimes occurs during an otherwise valid transmission when baud rate detector 48 is unable to confirm the correct baud rate due to the nature of the bit pattern in the code word, or from other causes. During the receipt of the entire code word in step 142 the method checks the mathematical validity of the code word, as specified in step 144. The validity of the code word is checked by validator 50 and includes error correction. The validity of the code word is also checked in step 144 if the outcome of step 123 indicates that the code word being received is the second or subsequent code word in a batch, and if step 124 indicated an incorrect baud rate for the first code word and the first code word was invalid in step 144, as will be described below.

After the entire code word has been received, error corrected, and checked for mathematical correctness in step 144, if the code word turns out to be a valid code word the method assumes that clock 40 is still synchronized with the transmission, and the "incorrect baud rate" output of detector 48 is ignored for the remainder of the batch. Validation of the code word confirms that the baud rate is, in fact, correct despite the outcome of step 124, as well as confirming that the pager's clock is synchronized. Valid code words cannot be received unless the clock is synchronized. In FIG. 7 the words "sync verified" next to the "yes" output of validator step 144 indicate that, for the remainder of the batch, the method assumes that the clock is synchronized. Also, when the code word validation step 144 determines that a valid code word has been received, the method continues in the synchronized mode and returns to step 120.

When the radio circuit is again enabled in step 120 to receive the second code word in the pager's timeslot, step 123 bypasses step 124 and proceeds to step 145. In step 145, if the baud rate of the first code word in the timeslot was correct, as determined by step 124, there is no need to check the baud rate again and the equivalent of a "correct" signal is sent to AND gate 130 via OR gate 131. If step 124 indicated an "incorrect" baud rate, the method proceeds to step 147. If the first code word was determined to be valid in step 144, step 147 provides the equivalent of a "correct" output from step 124 to AND gate 130 via OR gate 131. If the first code word was invalid, step 147 directs the method to step 144 again, via OR gate 148.

Returning to step 144, if the first code word in the timeslot proves invalid in step 144, the method proceeds to step 149 and increments a counter before proceeding to either receive the next code word or return to the signal validation mode 90. The counter function is performed within controller 36. When the number of consecutive invalid code words "I" exceeds a predetermined number "n" the method proceeds to step 150, wherein radio circuit 24 is turned off and operation of the pager returns to the signal validation mode 90. In the preferred embodiment of the present invention n=1. In other words, if two consecutive code words are determined to be invalid by code word validator 50 in step 144, it is assumed that the pager's clock 40 has become unsynchronized, or the pager is no longer receiving a valid transmission, and operation will return to search mode 90. Alternatively, if in step 144 only a single code word has been found to be invalid, the pager will continue operating in the synchronized mode for at least one additional code word. That protects against loss of a message when baud rate detector 48 mistakenly indicates a batch with an incorrect baud rate and validator 50 determines that only a single received code word is invalid.

Whenever preamble code is detected in step 126, the method proceeds directly to step 104 in FIG. 6 and the radio circuit is enabled until a synchronization code is encountered. The radio circuit remains enabled through at least one entire code word in step 126 as long as preamble detector 44 detects preamble code. Usually the absence of preamble code will be confirmed in step 126 within the first approximately ten received bits. The presence of preamble code is confirmed after a full code word has been received. When preamble code is detected, the radio circuit will remain on and operation of the pager returns to step 104, which maintains the radio circuit enabled until a synchronization code is encountered.

Step 128 is performed by address detector 63. Whenever a code word is received which corresponds to one of the pager's addresses, the method proceeds from step 128 to step 160, wherein the radio circuit is enabled to receive the entire code word. Step 160 also includes error correction, which is performed by validator 50. In step 160 the code word is received, error corrected, its validity is checked in step 161, and it is checked by address comparator 60 against the stored pager addresses. If the received code word is a valid pager address the method proceeds to step 163 wherein the message is displayed. If, during the receipt of a message, the pager encounters an invalid code word, the method proceeds, as specified in step 161, to increment a counter in step 162, like that used in step 149. If the number of received invalid code words "I" is less than or equal to a predetermined number ("pn" in FIG. 7), the method continues to enable the radio circuit and returns to step 160 to read and error correct a subsequent code word to determine if synchronization has been lost. In the preferred embodiment, if two consecutive code words are encountered (pn=1) during step 161 the method proceeds to step 150, which turns off the radio circuit and returns operation of the pager controller to the unsynchronized signal validation mode 90.

The operation of the pager 16 in FIG. 5, in accordance with the operating method illustrated in FIGS. 6 and 7, will now be described with reference to FIG. 8, which illustrates timing relationships by a series of horizontal time lines A through F. Line A shows a coded transmission in the POCSAG format. The transmission begins with 576-bits of preamble code followed by plurality of batches, each batch containing 544-bits. At the start of each batch is a synchronization code, designated "SC," followed by eight frames or timeslots designated "0" through "7." The number of batches transmitted following a preamble code depends on the number of pagers which need to be addressed and the length of the messages sent. The POCSAG standard is compatible with transmissions of any length.

Time line A shows a preamble followed by two complete batches and the start of a third. The baud rate of the transmission determines the scale of time line A, and of the other time lines in FIG. 8. For the purposes of the following explanation, all time lines in FIG. 8 have the same horizontal scale. In the description of the operation of pager 16, it is assumed that the pager's designated timeslot is timeslot #3.

Time line B shows the operation of radio circuit 24 in accordance with the invention when monitoring a pager transmission containing no information addressed to the pager. In the time interval between times 190 and 196 the pager is operating in the signal validation mode 90, wherein radio circuit 24 is periodically enabled to search for compatible pager transmissions. At time 192, step 94 (see FIG. 6) occurs and radio circuit 24 is enabled. In time line B the baud rate is assumed to be the correct baud rate for the pager and, when the radio circuit is enabled at time 192, preamble code is encountered. Consequently, radio circuit 24 continues to be enabled in accordance with step 104 until the first synchronization code is encountered, at time 196. The synchronization code causes the pager's internal clock 40 (see FIG. 5) to become synchronized with the transmission. The pager then begins operating in synchronized mode 92 (see FIG. 7). Radio circuit 24 is next enabled at time 200, at the start of the first code word in timeslot #3. Since the baud rate remains correct and no preamble code is encountered, address detector 63 begins analyzing the bits of the first code word in timeslot #3. In the example of time line B, the code word is not any of the pager's addresses and, as soon as the address detector determines that there is less than a predetermined correlation between the incoming bits and the receiver's addresses, and preamble detector 44 signals "not preamble code," and baud rate detector 48 signals "correct baud rate," the controller proceeds to step 136 and disables radio circuit 24, at time 202, until the beginning of the next code word. At time 204, which is the start of the second code word in timeslot #3, the radio circuit is enabled in accordance with step 120 and again no preamble code is encountered, address detector 63 again determines that there is less than a predetermined correlation between the incoming bits and the receiver's addresses, and the baud rate of the batch is assumed to be correct from the previous output of detector 48 during the first code word in the batch. Consequently, the radio circuit 24 is turned off, at time 206. The pager then continues operating in synchronized mode 92 until the next timeslot #3, in the next batch, at time 210. The steps described at times 200, 202, 204 and 206 are then repeated at times 210, 212, 214 and 216, respectively.

The radio circuit of pager 16 will continue to operate in accordance with the foregoing description as long as the transmission on time line A continues, assuming the transmission does not include the pager's address. The controller will enable the radio circuit at the start of each code word in the designated timeslot of the receiver, at times 200, 204, 210 and 214, and will disable the radio circuit before an entire code word has been received, at times 202, 206, 212 and 216, if (a) the baud rate of the batch is correct (step 124), and (b) the coded signal is not a preamble code (step 126), and (c) there is less than a predetermined correlation between the code word being received and the receiver's address (Step 128).

Time line C illustrates operation of pager 16 when, in the first batch of the transmission between times 196 and 208, the baud rate detector 48 indicates the incorrect baud rate. Between times 190 and 200 the pager operates exactly as in time line B. At time 200, the baud rate detector indicates an incorrect baud rate for the batch. That can happen during a valid transmission for various reasons, such as a garbled transmission resulting from intermittent interference, or a bit pattern in a coded transmission which momentarily continues the baud rate detector. Because the baud rate detector indicates an incorrect baud rate, and no preamble code is present, the method then proceeds to step 144 (see FIG. 7) and enables the radio circuit for an entire code word, from time 200 to time 204. Assuming the code word is valid, the method returns to step 120 and the radio circuit remains enabled for the start of the second code word in timeslot #3. Although the baud rate detector has indicated an incorrect baud rate for the batch, step 144 determined that the first code word was valid and since a mathematically correct code word will only be received when the pager's clock is synchronized, the methodology of the invention ignores the baud rate detector for the rest of that batch (steps 123, 145, and 147) and proceeds in synchronized mode 92. The radio circuit remains enabled through the start of the second code word, at time 204. For the second code word, step 126 will again indicate no preamble code and step 123 will bypass step 124. Step 145 will supply the equivalent of a "correct" signal to AND gate 130 since sync was verified by the outcome of step 144 for the first code word. Assuming the second code word is not one of the pager's addresses, radio circuit 24 will be quickly turned off when AND gate 130 receives the "not address" result from step 128, the "not preamble" from step 126 and the results of step 145. Turn-off occurs at time 206C, before the entire code word has been received. Time 206C occurs generally within a few bits of time 206 in time line B, but might differ slightly in time because differences in the patterns of incoming bits can alter the interval necessary for address detector 63 to confirm that the incoming bits are "not the pager's address," or for detector 44 to confirm "not preamble." Similarly, the time it takes for detector 48 to determine that the signal has the "correct" baud rate may vary in the first code word of the timeslot, which is when detector 48 is used. Some incoming bit patterns require more time to resolve than others and in each time line in FIG. 8, the letter of the line is added to the code word turn-off times 202, 206, 212, and 216 to indicate the possible slight differences in the time it takes for the method to accomplish steps 124, 126, and 128. Assuming the baud rate detector is still unable to confirm a correct baud rate in the batch starting at time 208, the steps which occurred starting at time 200 will be repeated in time line C starting at time 210.

Figure 8:
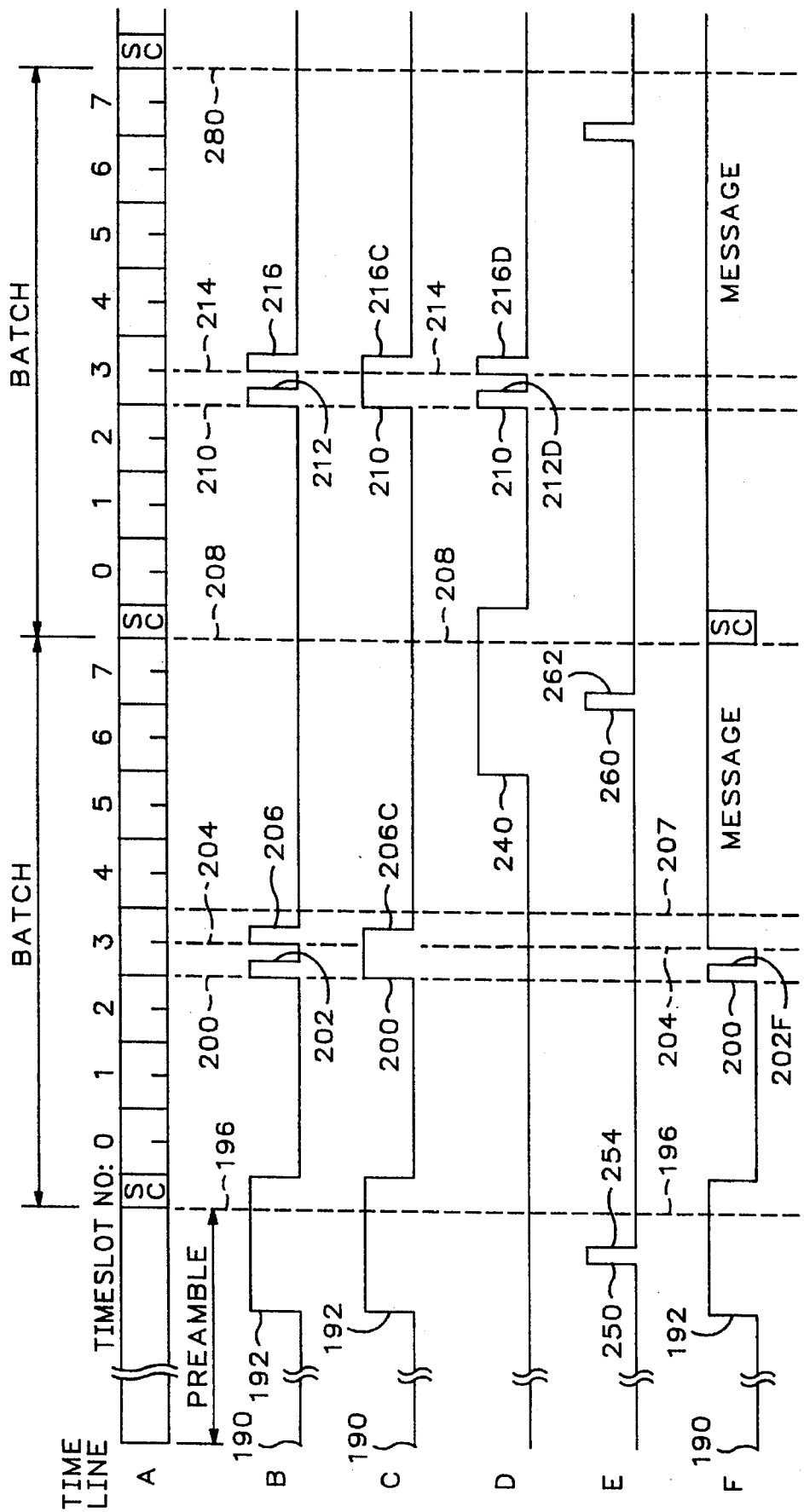
FIG. 8 is a timing diagram illustrating the operation of the circuitry of FIG. 5 in accordance with the flow diagrams of FIGS. 6 and 7.

The next time line in FIG. 8 is time line D, wherein the pager is turned on or brought within range of a transmitter in the middle of a transmission, after the preamble code has already been sent. The pager begins to receive the transmission at time 240, in the middle of the first batch. At the time the pager is turned on (or brought within range) it begins operating in the signal validation mode, i.e., the pager's clock is unsynchronized with the pager transmission and controller 36 periodically turns on the radio circuit to search for valid transmissions. At time 240 the radio circuit is enabled as part of the search for valid transmissions. Even though there is no preamble code, the baud rate is correct and the pager will remain enabled in accordance with steps 98, 100, and 104 until a synchronization code is encountered, at time 208. The synchronization code will synchronize clock 40 with the transmission and the pager will begin operating in synchronized mode 92. Operation will then continue in the same manner as in time line B for the second batch of the transmission. With the pager clock synchronized, the radio circuit will be enabled at the start of the first code word in timeslot #3, at time 210. Preamble code, baud rate, and address correlation will be checked in accordance with steps 126, 124, and 128, respectively. Assuming no preamble code, a correct baud rate, and bits which do not correlate with one of the pager's addresses, the radio circuit will be disabled before the end of the first code word, at time 212D. The radio circuit will again be enabled at the start of the second code word, at time 214 and, assuming no preamble code and bits which do not correlate with one of the pager's addresses, the radio circuit will be disabled before the entire second code word has been received, at time 216D. Subsequent batches will be monitored and decoded in the same manner as the code words in the second batch of time line B.

Time line E illustrates the operation of pager 16 when the transmission has the wrong baud rate. Assuming the radio circuit is first tuned on periodically at time 250, baud rate detector 48 will begin performing step 100 and will recognize the incorrect baud rate. Consequently, the output of detector 48, and of step 100 in FIG. 6, will switch from "correct" to "incorrect." That switch takes a maximum of one code word, although is usually takes only approximately 6–16 bits' duration. Similarly, an incorrect baud rate will cause the output of preamble detector 44, and of step 98, to switch from "yes, preamble" to "no, not preamble," usually within 7–10 bits' duration although it could take up to 32-bits to confirm the absence of preamble code. When the outputs of detectors 44 and 48 are coincidentally "no, not preamble" and "incorrect baud rate," respectively, the method proceeds via AND gate 110 to step 114, wherein the radio circuit is turned off and continues to be periodically enabled in accordance with step 94 to search for valid transmissions. After a predetermined interval, which is preferably 244-bits' duration, the radio circuit will again be enabled, in accordance with step 94, at time 260. The baud rate is still incorrect and no preamble code will be detected.

Therefore, the radio circuit will again be tuned off in accordance with step 114, at time 262. The foregoing steps will continue at predetermined intervals until the pager begins to receive valid data at the correct baud rate.

Finally, time line F shows the pager receiving an incoming message. Between times 190 and 196 the pager is in the signal validation mode 90 and the radio circuit is enabled and disabled as described with respect to time line B. After the synchronization code has been received, at time 196, the pager enters the synchronized mode and the radio circuit is enabled at the start of the first code word in timeslot #3, at time 200. Assuming the first code word in the timeslot is not the pager's address, and synchronization has been continued by a "correct" output of step 124 and a "no" output of step 126, the radio circuit will be disabled at time 202F, before an entire code word is received. The radio circuit will then be enabled at the start of the second code word, at time 204. This time the address detector will encounter a code word matching the pager's addresses. Consequently, address detector 63 will be unable preclude the absence of the pager's addresses and the entire code word will be received. The method then proceeds to step 137, wherein the entire code word is error corrected and checked against addresses stored in the pager. Step 137 is performed by validator 50 and address comparator 60. When a comparison of the received code word against the stored address codes reveals that the received signal contains one of the pager's addresses, the radio controller 36 begins operating in a message receiving mode in which the radio circuit remains enabled and each arriving code word is error corrected and decoded by message decoder 66. In time line F, the second code word in timeslot #3 ends at time 207. Between time 204 and time 207 a pager address is received, error corrected, and verified. And beginning at time 207 the radio circuit remains enabled to receive the subsequent code words containing message information. As long as code words beginning with "1" in the flag bit location (see FIG. 4) are received, indicating message code words, and two consecutive invalid code words are not encountered (see steps 161 and 162), the radio controller will enable radio circuit 24. At the conclusion of the message, a code word beginning with "0" will arrive and, assuming the pager's clock remains synchronized, the pager will revert to operating in synchronized mode 92.

The system and method of the present invention provides an improved technique for controlling the operation of pagers. The invention uses baud rate and preamble code information to track the operation of the pager. In particular, it uses baud rate and preamble code information, to help determine whether the pager remains synchronized with incoming coded transmissions. It also provides information to the battery-savings radio controller regarding the correlation or lack of correlation between incoming code words and the pager's addresses. An entire code word need not be received, or even a predetermined fraction of a code word, before the radio circuit can be de-energized, provided the incoming bits have less than a predetermined correlation with the pager's stored addresses. Once the pager is operating in the synchronized mode, a three-step test is performed. If (a) the baud rate of the batch is correct; (b) the signal is not preamble code; and (c) there is less than a predetermined correlation between the incoming bits and the pager's address, then the radio circuit is turned off. Baud rate and preamble code information is selectively sampled frequently during pager operation. That information enables the pager to improve battery savings during both the signal validation and synchronization modes. Battery power is saved because the pager does not need to receive any synchronization codes after the clock becomes synchronized. Moreover, synchronization is checked and verified without the need to energize the radio circuitry for even a portion of the synchronization codes which are subsequently transmitted. That mean, in addition to reducing the "on" time for the radio circuit, the invention avoids having to power up and stabilize the radio circuit to receive the synchronization codes, further improving battery savings. Altogether, the system and method of the present invention represents an advance in pager design which further enhances the efficiency of pager receivers while reliably detecting and decoding any messages directed to the pager.

Alternative embodiment of the above-described system and method for analyzing coded pager transmissions are possible within the scope of the present invention. For example, although the invention is intended for use with paging networks employing the POCSAG paging standard, variations from the POCSAG encoding format compatible with the invention will occur to those skilled in the art. A coding standard which sent only a single synchronization code, following the preamble, would be compatible with the present invention. Also, the number of timeslots or frames in a batch could be increased or decreased without affecting the operation of a pager which incorporates the present invention. The invention is not limited to a particular type of preamble detector, baud rate detector, or error correction scheme. Although the preferred embodiment samples the baud rate only on the first code word in the pager's designated timeslot, it is possible to sample the baud rate every time the radio circuit is enabled, although the preferred embodiment uses less battery power. Other modifications and variations within the scope of the present invention will occur to those skilled in the art.

What is claimed is:

1. A decoder for use in a mobile message receiver which receives and processes coded transmissions of the type which selectively include a preamble code and batches of other codes, each such batch including a synchronization code followed by a plurality of code words in predetermined timeslots, and wherein one or more designated timeslots are the timeslots where the receiver's one or more stored addresses are transmitted when information is sent, the receiver including an internal clock which is synchronized with a coded transmission when a synchronization code is received, the coded transmissions being transmitted at various selected baud rates, one or more of which is a correct baud rate for the decoder, and the receiver including a radio circuit which is selectively enabled to receive a coded transmission and produce a coded signal therefrom, the decoder comprising:

a baud rate detector which monitors said coded signal to determine if the baud rate of the coded transmission corresponds to a correct baud rate for the decoder;

a preamble detector which monitors said coded signal to detect preamble code;

an address detector which monitors said coded signal and compares the incoming bits of each received code word against the one or more stored addresses in the receiver to identify uncorrelated incoming bits which do not match the bit pattern of at least one stored address, said address detector determining that the received code word is not one of the receiver's addresses when the incoming bits include two uncorrelated bits separated by more than a predetermined number of intervening bits; and an enabling controller responsive to said baud rate detector, said preamble detector, and said address detector for selectively enabling and disabling the radio circuit when the receiver is in a synchronized mode of operation wherein the internal clock of the receiver is synchronized with a coded transmission, the enabling controller enabling the radio circuit at the start of each code word in the designated timeslots of the receiver, and disabling the radio circuit before an entire code word has been received if:

(a) the baud rate is correct; and (b) the coded signal is not a preamble code; and (c) the code word is not one of the receiver's addresses.

2. A decoder as in claim 1 in which said address detector determines that the received code word is not one of the receiver's addresses when the incoming bits include two uncorrelated bits separated by more than four intervening bits.

3. A decoder as in claim 1 in which said preamble detector monitors said coded signal and compares the incoming bits against the bit pattern of the preamble code to identify error bits which do not match the bit pattern of the preamble code, said preamble detector determining that the coded signal is not preamble code when the incoming bits include two error bits separated by more than a predetermined number of intervening bits.

4. A decoder as in claim 3 in which said preamble detector determines that the coded signal is not preamble code when the incoming bits include two error bits separated by more than four intervening bits.

5. A decoder as in claim 1 in which, when the internal clock of the receiver is synchronized with the coded transmission, and the enabling controller enables the radio circuit at the start of each code word in the designated timeslots of the receiver, the controller continues to enable the radio circuit long enough to receive substantially an entire code word if either of the following occurs:

(a) the baud rate detector determines that the baud rate of the batch is incorrect; or (b) the preamble detector determines that the coded signal is preamble code.

6. A decoder as in claim 5, including a code word validator which monitors said coded signal and determines if the signal being received contains a valid code word, said enabling controller enabling the radio circuit at the start of each code word in the designated timeslots of the receiver and, if the baud rate of the code word is incorrect and the coded signal is not preamble code, said enabling controller continues to enable the radio circuit for at least an entire code word, and continues to enable the radio circuit at the start of each code word in the designated timeslots of the receiver as long as said code word validator determines that the coded signal contains valid code words.

7. A decoder as in claim 6 in which said enabling controller responds to a predetermined number of consecutive code words that said code word validator determines to be invalid by discontinuing enabling the radio circuit at the start of each code word in said designated timeslots and beginning a mode of operation in which the radio circuit is periodically enabled to search for coded transmissions.

8. An energy saving method for pager receivers of the type which include a radio circuit and an internal clock and which receive and decode digitally coded transmissions which selectively includes a preamble code followed by batches of other codes, each batch including a synchronization code followed by a plurality of code words in selected time slots, at least one of the time slots being a designated time slot in which one or more of an individual receiver's stored addresses are transmitted when message information is sent, such coded transmissions being sent to such receivers at various selected baud rates, one or more of which is a correct baud rate for the receiver, the method being carried out when the receiver's clock is synchronized with a selected coded transmission and comprising the following steps:

enabling the radio circuit at the start of each code word in the designated time slots of the receiver; and disabling the radio circuit within less than the duration of a single code word if all of the following are true:
(a) the baud rate of the coded transmission corresponds to the correct baud rate for the receiver; and
(b) the coded transmission is not a preamble code; and
(c) at least two of the incoming bits of the coded transmission, separated from one another by at least a predetermined number of intervening bits, do not match the bit pattern of at least one of the receiver's stored addresses.

9. An energy saving method for pager receivers as in claim 8 in which step (c) is determined to be true if two of the incoming bits of the coded transmission separated from one another by more than four intervening bits do not match the bit pattern of at least one of the receiver's stored addresses.

10. An energy saving method for pager receivers as in claim 8 in which step (b) is determined to be true if two of the incoming bits of the coded transmission separated from one another by more than four intervening bits do not match the bit pattern of the preamble code.

11. A method as in claim 8 in which the receiver's stored addresses are predetermined bit patterns which are compared against the incoming bits of the coded transmission to determine if individual incoming bits correspond to the bits in corresponding locations in one of the receiver's stored addresses, and part (c) of the step that includes disabling the radio circuit within less than the duration of a single code word further includes:

(1) identifying each bit of the coded transmission as it is received;

(2) comparing each bit against the bit patterns of the receiver's addresses;

(3) identifying one incoming error bit which does not correspond the pattern of one of the receiver's stored addresses the received bits is sufficiently different from the patterns of bits; and (4) skipping a predetermined number of subsequent incoming bits following the identification of the error bit in step (3) before again looking for error bits; and (5) disabling the radio circuit if during a code word another error bit is identified following step (4).

12. A method as in claim 11 in which the predetermined number of subsequent incoming bits skipped in step (4) is five bits.

13. A method as in claim 11 in which the step of disabling the radio circuit within less than the duration of a single code word is replaced by the step of continuing to enable the radio circuit for the duration of at least an entire code word if either:

(a) preamble code is detected; or (b) the baud rate is incorrect.

14. A method as in claim 13 in which step (a) is determined to be false and preamble code is not detected if at least two of the incoming bits of the coded transmission, separated from one another by more than four intervening bits, do not match the bit pattern of the preamble code.

15. A method for receiving and processing coded transmissions for use in a mobile message receiver, the coded transmissions being of a type which include bits in selected positions and which are transmitted at various selected baud rates, the transmissions generally including a preamble code and batches of other codes, each batch including a synchronization code followed by a plurality of code words in predetermined time slots, wherein one or more designated time slots are the time slots where a particular receiver's one or more addresses are transmitted when message information is sent to the receiver, the receiver including a radio circuit which is selectively enabled to receive the coded transmissions, and a clock for identifying selected bit positions when synchronized with a transmission, the method for receiving and processing coded transmissions comprising the following steps:

(a) when the receiver's clock is unsynchronized with a coded transmission, periodically enabling the radio circuit to search for compatible coded transmissions which have a baud rate corresponding to the correct baud rate for the receiver and, each time said enabling step is performed;
  (1) determining if the baud rate of the coded transmission is the correct baud rate for the receiver;
  (2) determining if the coded transmission is a preamble code; and
  (3) responding to the baud rate and preamble code information to selectively enable the radio circuit until a synchronization code is received to synchronize the receiver's clock with the coded transmission; and (b) when the receiver is operating in a synchronized mode in which a synchronization code has been received in accordance with (a)(3) and the receiver's clock has been synchronized with a coded transmission, enabling the radio circuit at the beginning of each code word in the designated time slots of the receiver without repeatedly enabling the radio circuit to receive additional transmitted synchronization codes and, each time the radio circuit is enabled,
  (1) determining at least once in each batch if the baud rate of the coded transmission is the correct baud rate for the receiver; and
  (2) determining if the coded transmission is a preamble code; and
  (3) disabling the radio circuit in less than the duration of a code word if the baud rate is correct, and no preamble code is being received, and at least two of the incoming bits of the code word being received, separated from one another by more than four intervening bits, do not match the bit pattern of at least one of the receiver's addresses.

16. A decoder as in claim 15 in which step (b) is determined to be true if two of the incoming bits of the coded transmission separated from one another by more than four intervening bits do not match the bit pattern of the preamble code.

17. A method as in claim 15 in which, when the receiver is operating in the synchronized mode in accordance with (b), synchronization between the receiver's clock and the coded transmission is monitored by using the baud rate and preamble code information in accordance with the following steps:

(i) if the coded transmission is determined to be preamble code, continue to enable to radio circuit for at least the duration of a code word, and then return the operation of the receiver to the search mode: or (ii) if the coded transmission is not a preamble code and the baud rate is a correct rate for the receiver, enable the radio circuit at the start of each code word in the predetermined time slot and continue to enable the radio circuit until two incoming bits, separated from one another by more than four intervening bits, are identified which are error bits that do not match the bit pattern of at least one of the receiver's addresses, then disable the radio circuit and continuing to operate the receiver in the synchronized mode: or (iii) if the coded transmission is not a preamble code and the baud rate is an incorrect baud rate for the receiver, enable the radio circuit at the start of at least the first code word in the predetermined time slot, continue to enable the radio circuit for the duration of each code word, checking the validity of the code word and, if a predetermined number of consecutive code words are not valid code words, then return the operation of the receiver to the search mode.

18. A decoder for use in a mobile message receiver which receives and processes coded transmissions that include bits of information in selected positions to encode selected addresses and informational messages which are directed to selected individual receivers, the coded transmissions including a preamble code and batches of other codes which include code words that correspond to one or more of the receiver's predetermined addresses when message information is directed to the receiver, the receiver being battery powered and having a plurality of power consuming operating elements including a radio circuit which is selectively enabled to receive a coded transmission and produce a coded signal therefrom, an internal clock which serves to identify selected bit positions when synchronized with a coded transmission, and the coded transmissions being transmitted at various selected baud rates, one or more of which is a correct baud rate for the decoder, the decoder further comprising:

a baud rate detector which monitors the coded signal to determine if the baud rate of the coded transmission corresponds to a correct baud rate for the decoder;

a preamble detector which monitors the coded signal to detect a preamble code:

an address detector which monitors said coded signal and compares the incoming bits of each received code word against the one or more stored addresses in the receiver to identify uncorrelated incoming bits which do not match the bit pattern of at least one predetermined address, said address detector determining that the received code word is not one of the receiver's addresses when the incoming bits include two uncorrelated bits separated by more than a predetermined number of intervening bits; and a receiver controller which selectively enables and disables selected power consuming elements, including the radio circuit, in response to said baud rate detector, said preamble detector, and said address detector, and wherein said controller, when operating with its internal clock synchronized with the coded transmission, monitors the synchronization of the clock by monitoring the outputs of said baud rate detector and said preamble detector without repeatedly energizing the radio circuit to receive the transmitted synchronization codes, and enables said radio circuit to receive the beginning of selected code words and disables said radio circuit before the entire code word is received if the output of said baud rate detector indicates that the baud rate is correct and the output of said preamble detector indicates that the received code word is not preamble code, and if said address detector determines that the incoming bits include two uncorrelated bits separated by more than a predetermined number of intervening bits.

19. A decoder as in claim 18 in which said address detector determines that the incoming code word is not one of the receiver's predetermined addresses when the incoming bits include two uncorrelated bits separated by more than four intervening bits.

20. A decoder as in claim 18 in which said preamble detector monitors said coded signal and compares the incoming bits against the bit pattern of the preamble code to identify error bits which do not match the bit pattern of the preamble code, said preamble detector determining that the coded signal is not preamble code when the incoming bits include two error bits separated by more than a predetermined number of intervening bits.

21. A decoder as in claim 20 in which said preamble detector determines that the coded signal is not preamble code when the incoming bits include two error bits separated by more than four intervening bits.

22. A method for reducing the energy consumed by a mobile message receiver which includes a radio circuit and an internal clock and which receives and decodes digitally coded transmissions of the type which selectively include a preamble code and batches of other codes including code words that correspond to one or more of the receiver's addresses when information is directed to the receiver, the receiver including a radio circuit which is selectively enabled to receive a coded transmission and produce a coded signal therefrom, and an internal clock which is synchronized with a coded transmission when the transmission is being received and decoded, and the coded transmissions are transmitted at various selected baud rates, one or more or which is a correct baud rate for the decoder, the method being performed when the receiver's internal clock is synchronized with a coded transmission and comprises the following steps:

enabling the radio circuit at selected times to receive the beginning of selected code words included in the coded transmission;

determining, each time the radio circuit is enabled, if the coded transmission is a preamble code;

determining, at predetermined intervals, if the baud rate of the coded transmission corresponds to a correct baud rate for the receiver; determining, each time the radio circuit is enabled, if at least two of the incoming bits of the coded transmission, separated from one another by at least a predetermined number of intervening bits, do not match the bit pattern of at least one of the receiver's addresses; and disabling the radio circuit before an entire code word has been received if the baud rate is the correct baud rate for the receiver, and the preamble code information indicates that the coded transmission is not preamble code, and if there are at least two incoming bits of the code word, separated from one another by at least a predetermined number of intervening bits, which do not match the bit pattern of at least one of the receiver's addresses.

23. A method as in claim 22 in which the step of disabling the radio circuit before an entire code word has been received is performed if the baud rate is the correct baud rate for the receiver, and the preamble code information indicates that the coded transmission is not preamble code, and if there are at least two incoming bits of the code word, separated from one another by more than four intervening bits, which do not match the bit pattern of at least one of the receiver's addresses.

24. A method as in claim 22 in which the step of determining if the coded transmission is a preamble code includes determining that the coded transmission is not a preamble code if at least two of the incoming bits of the coded transmission, separated from one another by at least a predetermined number of intervening bits, do not match the bit pattern of a preamble code.

25. A method as in claim 24 in which the determination that the coded transmission is not a preamble code is reached if at least two of the incoming bits of the coded transmission, separated from one another by at least a four intervening bits, do not match the bit pattern of a preamble code.

26. A method as in claim 22 in which the predetermined interval in which the step of determining if the baud rate of the coded transmission corresponds to a correct baud rate for the receiver is at least once every 544-bits.

27. A method as in claim 22 in which said steps of determining if the coded transmission is a preamble code and determining if the baud rate of the coded transmission corresponds to a correct baud rate for the receiver provide a positive indication that the receiver's internal clock remains synchronized with the coded transmission if the coded transmission is not preamble code and the baud rate is a correct baud rate for the receiver.

28. A method as in claim 22 in which said steps of determining if the coded transmission is a preamble code, determining if the baud rate of the coded transmission corresponds to a correct baud rate for the receiver, and determining if at least two of the incoming bits of the coded transmission, separated from one another by at least a predetermined number of intervening bits, do not match the bit pattern of at least one of the receiver's addresses are performed substantially simultaneously at least once each 544-bits of the coded transmission.

29. An address detector for use in mobile message receivers of the type which receive and process coded transmissions that contain code words and other information, the receivers each having one or more stored addresses, and the coded transmissions including at least one code word which corresponds an address stored in one or more specific receivers when sending information those one or more specific receivers, the address detector comprising:

means for comparing the incoming bits of a received code word with the bits of the receiver's stored addresses and for identifying each uncorrelated incoming bit that does not match the corresponding bit in at least one of the receiver's stored addresses; and means for counting a predetermined number of bits following the identification the first uncorrelated bit in an incoming code word, the address detector determining that the coded transmission does not contain one of the receiver's stored addresses whenever the incoming bits of a received code word include two uncorrelated bits separated by more than said predetermined number of intervening bits, whereby the address detector can determine that a received code word is not one of the receiver's addresses in less than the duration of a single code word.

30. An address detector as in claim 29 in which said means for counting a predetermined number of bits counts five bits, such that whenever the incoming bits of a received code word include two uncorrelated bits separated by five or more intervening bits, the incoming code word is not one of the receiver's addresses.

31. An address detector for use in POCSAG pagers that receive and process coded transmissions containing 32-bit code words and other information, the pagers each having one or more stored addresses and, when a transmission is directed to one or more specific pagers, the transmission including at least one code word in a time slot assigned to the pager corresponding to an address stored in the one or more specific pagers, the address detector comprising:

means for comparing the incoming bits of a received code word in a time slot assigned to the pager with the bits of the pager's stored addresses and for identifying each uncorrelated incoming bit that does not match the corresponding bit in at least one of the pager's stored addresses; and means for counting a predetermined number of bits following the identification the first uncorrelated bit in an incoming code word, the address detector determining that the coded transmission does not contain one of the pager's stored addresses whenever the incoming bits of a received code word include two uncorrelated bits separated by more than said predetermined number of intervening bits, whereby the address detector can determine that a received code word is not one of the pager's addresses in less than the duration of a single code word.

32. An address detector as in claim 31 in which said means for counting a predetermined number of bits counts five bits, such that whenever the incoming bits of a received code word include two uncorrelated bits separated by five or more intervening bits, the incoming code word is not one of the pager's addresses.

33. A method of determining in less than the duration of a single code word whether or not an incoming code word of a coded transmission being received by a mobile message receiver corresponds to one of the receiver's stored addresses, the method comprising the following steps:

(1) comparing the incoming bits of a received code word with the bits of the receiver's stored addresses;

(2) identifying a first uncorrelated incoming bit that does not match the corresponding bit in at least one of the receiver's stored addresses;

(3) skipping a predetermined number of subsequent incoming bits of the code word following the uncorrelated bit identified in step (2), and them resuming step (1) of comparing the incoming bits with the bits of the receiver's stored addresses; and (4) determining that the incoming code word is not one of the receiver's addresses if another uncorrelated bit is identified which is separated by at least said predetermined number of incoming bits from the first uncorrelated bit found in step (2).

34. A method as in claim 33 in which said predetermined number of bits skipped in step (2) is five bits.

35. In a POCSAG pager decoder for receiving and decoding coded transmission containing code word and other information, a method of determining in less than the duration of a single code word being received by the pager whether or not an incoming code word of an incoming coded transmission corresponds to one of the pager's stored addresses, the method comprising the following steps:

(1) comparing the incoming bits of a received code word with the bits of the pager's stored addresses;

(2) identifying a first uncorrelated incoming bit that does not match the corresponding bit in at least one of the pager's stored addresses;

(3) skipping a predetermined number of subsequent incoming bits of the code word following the uncorrelated bit identified in step (2), and them resuming step (1) of comparing the incoming bits with the bits of the pager's stored addresses; and (4) determining that the incoming code word is not one of the pager's addresses if another uncorrelated bit is identified in the code word which is separated by at least said predetermined number of incoming bits from the first uncorrelated bit found in step (2).

36. A method as in claim 35 in which said predetermined number of bits skipped in step (2) is five bits.

37. A preamble code detector for use in mobile message receivers of the type which receive and process coded transmissions that contain preamble code, code words, and other information, the preamble code detector comprising:

means for comparing the incoming bits of a received coded transmission with the bit patterns of a preamble code and for identifying each incoming error bit that does not match the bit pattern of a preamble code; and means for counting a predetermined number of bits following the identification the first error bit in an incoming coded transmission, the preamble code detector determining that the coded transmission is not preamble code whenever the incoming bits of a received coded transmission include two error bits separated by more than said predetermined number of intervening bits.

38. A preamble code detector as in claim 37 in which said means for counting a predetermined number of bits counts five bits, such that whenever the incoming bits of a received coded transmission include two error bits separated by five or more intervening bits, the incoming coded transmission is not preamble code.

39. In a pager decoder for receiving and decoding coded transmissions which selectively contain preamble code, code words, and other information, a method of determining whether or not a coded pager transmission is preamble coded comprising the following steps:

(1) comparing the incoming bits of a received coded transmission with the bit patterns of a preamble code;

(2) identifying a first error bit which is a bit that does not match the corresponding bit in a preamble code:

(3) skipping a predetermined number of subsequent incoming bits of the coded transmission word following the first error bit identified in step (2), and them resuming step (1) of comparing the incoming bits with the bit patterns of a preamble code; and (4) determining that the incoming code word is not preamble code if another error bit is identified separated by at least said predetermined number of incoming bits from the first error bit identified in step (2).

40. A method as in claim 39 in which said predetermined number of bits skipped in step (2) is five bits.

* * * * *